US011675550B2

(12) United States Patent
Okumura

(10) Patent No.: US 11,675,550 B2
(45) Date of Patent: Jun. 13, 2023

(54) INFORMATION PROCESSING APPARATUS, TAPE PRINTING APPARATUS, PRINTING SYSTEM, METHOD OF CONTROLLING INFORMATION PROCESSING APPARATUS, AND STORAGE MEDIUM STORING PROGRAM FOR CONTROLLING INFORMATION PROCESSING APPARATUS

(71) Applicant: SEIKO EPSON CORPORATION, Tokyo (JP)

(72) Inventor: Yoichi Okumura, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/748,142

(22) Filed: May 19, 2022

(65) Prior Publication Data

US 2022/0374177 A1   Nov. 24, 2022

(30) Foreign Application Priority Data

May 20, 2021 (JP) .............................. JP2021-085233

(51) Int. Cl.
  G06F 3/12   (2006.01)
  B41J 3/407  (2006.01)
(52) U.S. Cl.
  CPC .......... G06F 3/1208 (2013.01); B41J 3/4075 (2013.01); G06F 3/1251 (2013.01); G06F 3/1258 (2013.01)
(58) Field of Classification Search
  CPC .... G06F 3/1208; G06F 3/1251; G06F 3/1258; B41J 3/4075
  See application file for complete search history.

(56) References Cited

U.S. PATENT DOCUMENTS

| | | | | |
|---|---|---|---|---|
| 5,887,997 | A * | 3/1999 | Watanabe | .................. B41J 3/44 400/615.2 |
| 6,424,423 | B1 | 7/2002 | Hosokawa et al. | |
| 2008/0014001 | A1 | 1/2008 | Horii | |
| 2016/0107453 | A1 | 4/2016 | Ishii | |
| 2019/0147018 | A1* | 5/2019 | Ito | .......................... G06F 3/1208 358/1.11 |
| 2020/0223241 | A1* | 7/2020 | Yamashita | ............... B41J 29/38 |

FOREIGN PATENT DOCUMENTS

| | | |
|---|---|---|
| JP | H07-199887 A | 8/1995 |
| JP | 2000-127545 A | 5/2000 |
| JP | 2008-021248 A | 1/2008 |
| JP | 2016-078353 A | 5/2016 |

* cited by examiner

*Primary Examiner* — Iriana Cruz
(74) *Attorney, Agent, or Firm* — Oliff PLC

(57) ABSTRACT

An information processing apparatus includes: a display controller; a letter-size setting section that sets a letter size of a letter string over a plurality of lines which has been entered through an edit screen; and a print controller that prints the letter string in the letter size set by the letter-size setting section. The letter-size setting section can differently set letter sizes of the letter string. When a line feed operation is performed at a head or end of an n-th line through the edit screen, a letter size of the n-th line preset in accordance with a user's designation, the letter-size setting section sets a letter size of one of the n-th line and an (n+1)-th line after the line feed operation so that a length of letter string over the plurality of lines is equal to or shorter than a length of the printable area.

12 Claims, 22 Drawing Sheets

FIG. 3
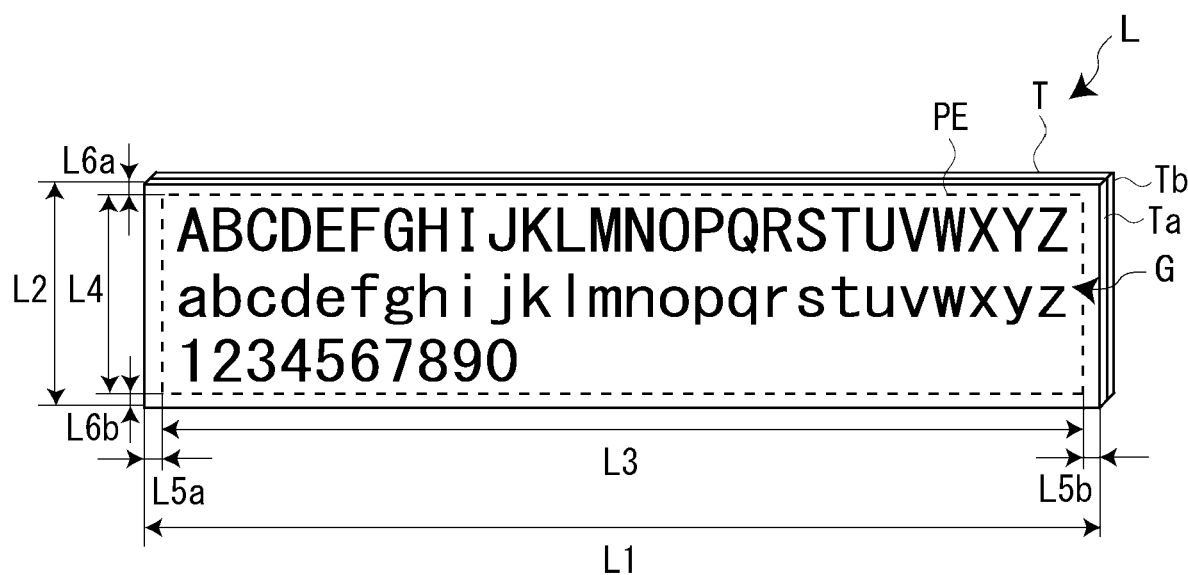
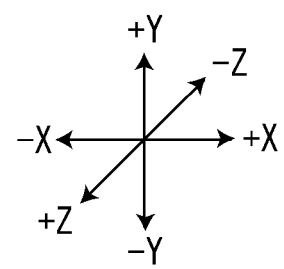

FIG. 9

| LETTER SIZE | 36 mm | 24 mm | 18 mm |
|---|---|---|---|
| 5 | SUPPORTED | SUPPORTED | SUPPORTED |
| 6 | SUPPORTED | SUPPORTED | SUPPORTED |
| 8 | SUPPORTED | SUPPORTED | SUPPORTED |
| 10 | SUPPORTED | SUPPORTED | SUPPORTED |
| 13 | SUPPORTED | SUPPORTED | SUPPORTED |
| 16 | SUPPORTED | SUPPORTED | SUPPORTED |
| 19 | SUPPORTED | SUPPORTED | SUPPORTED |
| 26 | SUPPORTED | SUPPORTED | SUPPORTED |
| 32 | SUPPORTED | SUPPORTED | SUPPORTED |
| 38 | SUPPORTED | SUPPORTED | SUPPORTED |
| 51 | SUPPORTED | SUPPORTED | NON-SUPPORTED |
| 64 | SUPPORTED | NON-SUPPORTED | NON-SUPPORTED |
| 79 | SUPPORTED | NON-SUPPORTED | NON-SUPPORTED |

INFORMATION PROCESSING APPARATUS, TAPE PRINTING APPARATUS, PRINTING SYSTEM, METHOD OF CONTROLLING INFORMATION PROCESSING APPARATUS, AND STORAGE MEDIUM STORING PROGRAM FOR CONTROLLING INFORMATION PROCESSING APPARATUS

The present application is based on, and claims priority from JP Application Serial Number 2021-085233, filed May 20, 2021, the disclosure of which is hereby incorporated by reference herein in its entirety.

BACKGROUND

1. Technical Field

The present disclosure relates to an information processing apparatus, a tape printing apparatus, a printing system, a method of controlling such an information processing apparatus, and a storage medium that stores a program for controlling such an information processing apparatus.

2. Related Art

As disclosed in JP-A-2008-021248, some tape printing apparatuses known in the art display an edit screen that allows a user to edit a letter string before it is printed on a print medium. In addition, when receiving the entry of a letter string over a plurality of lines through the edit screen, such tape printing apparatuses allow the user to differently set the letter sizes of the letter string on the respective lines.

When receiving a user's line feed operation on an n-th line (n: integer≥1) whose letter size has been designated, a tape printing apparatus, as described above, sets the letter size of the n-th and (n+1)-th lines to the letter size of the n-th line which has been set before the line feed operation. On the other hand, if a print medium is a tape, when a tape printing apparatus prints a letter string over a plurality of lines on this tape with a line direction (orthogonal to an extending direction of each line) aligned with a width direction of a tape, the length of the printable area in the line direction may be insufficient. For example, when a tape printing apparatus receives a user's line feed operation on the n-th line whose letter size has been designated, the letter string over the plurality of lines may partly protrude from the printable area in the line direction during the editing. In this case, the tape printing apparatus may reject this line feed operation and display an error message. As a result, the user needs to perform some inconvenient processes, such as decreasing the letter size of the n-th line, performing the line feed operation again, and setting the letter size of the n-th line to the previous size.

SUMMARY

According to a first aspect of the present disclosure, an information processing apparatus includes: a display controller that causes a display section to display an edit screen that allows for an edit of a letter string over a plurality of lines, the letter string to be printed within a printable area on a print medium by a tape printing apparatus; a letter-size setting section that sets a letter size of the letter string over the plurality of lines, the letter string being entered through the edit screen; and a print controller that causes the tape printing apparatus to print the letter string over the plurality of lines entered through the edit screen in the letter size set by the letter-size setting section. The letter-size setting section is configured to differently set letter sizes of the letter string on the respective lines. When a line feed operation is performed at a head or an end of an n-th line through the edit screen, a letter size of the n-th line being preset in accordance with a user's designation, n being an integer equal to or more than one, the letter-size setting section automatically sets a letter size of at least one of the n-th line and an (n+1)-th line after the line feed operation so that a length, in a line direction, of the letter string over the plurality of lines entered through the edit screen is equal to or shorter than a length of the printable area in the line direction, the line direction being orthogonal to an extending direction of the lines.

According to a second aspect of the present disclosure, a tape printing apparatus includes: a printing section that prints an image on a print medium; a display controller that causes a display section to display an edit screen that allows for an edit of a letter string over a plurality of lines, the letter string to be printed within a printable area on the print medium by the printing section; a letter-size setting section that sets a letter size of the letter string over the plurality of lines, the letter string being entered through the edit screen; and a print controller that causes the printing section to print the letter string over the plurality of lines entered through the edit screen in the letter size set by the letter-size setting section. The letter-size setting section is configured to differently set letter sizes of the letter string on the respective lines. When a line feed operation is performed at a head or an end of an n-th line through the edit screen, a letter size of the n-th line being preset in accordance with a user's designation, n being an integer equal to or more than one, the letter-size setting section automatically sets a letter size of at least one of the n-th line and an (n+1)-th line after the line feed operation so that a length, in a line direction, of the letter string over the plurality of lines entered through the edit screen is equal to or shorter than a length of the printable area in the line direction, the line direction being orthogonal to an extending direction of the lines.

According to a third aspect of the present disclosure, a printing system includes: an information processing apparatus; and a tape printing apparatus connected to the information processing apparatus, the tape printing apparatus configured to communicate with the information processing apparatus. The information processing apparatus includes: a display controller that causes a display section to display an edit screen that allows for an edit of a letter string over a plurality of lines, the letter string to be printed within a printable area on a print medium by the tape printing apparatus; a letter-size setting section that sets a letter size of the letter string over the plurality of lines, the letter string being entered through the edit screen; and a print controller that causes the tape printing apparatus to print the letter string over the plurality of lines entered through the edit screen in the letter size set by the letter-size setting section. The letter-size setting section is configured to differently set letter sizes of the letter string on the respective lines. When a line feed operation is performed at a head or an end of an n-th line through the edit screen, a letter size of the n-th line being preset in accordance with a user's designation, n being an integer equal to or more than one, the letter-size setting section automatically sets a letter size of at least one of the n-th line and an (n+1)-th line after the line feed operation so that a length, in a line direction, of the letter string over the plurality of lines entered through the edit screen is equal to or shorter than a length of the printable area in the line direction, the line direction being orthogonal to an extending direction of the lines.

According to a fourth aspect of the present disclosure, a method of controlling an information processing apparatus includes: causing, by using the information processing apparatus, a display section to display an edit screen that allows for an edit of a letter string over a plurality of lines, the letter string to be printed within a printable area on a print medium by a tape printing apparatus; setting, by using the information processing apparatus, a letter size of the letter string over the plurality of lines, the letter string being entered through the edit screen; and causing, by using the information processing apparatus, the tape printing apparatus to print the letter string over the plurality of lines entered through the edit screen with the set letter size. In setting of the letter size of the letter string over the plurality of lines, letter sizes of the letter string are configured to be differently set on the respective lines and, when a line feed operation is performed at a head or an end of an n-th line through the edit screen, a letter size of the n-th line being preset in accordance with a user's designation, n being an integer equal to or more than one, a letter size of at least one of the n-th line and an (n+1)-th line after the line feed operation is set so that a length, in a line direction, of the letter string over the plurality of lines entered through the edit screen is equal to or shorter than a length of the printable area in the line direction, the line direction being orthogonal to an extending direction of the lines.

According to a fifth aspect of the present disclosure, a non-transitory computer-readable storage medium stores a program that includes: causing, by using an information processing apparatus, a display section to display an edit screen that allows for an edit of a letter string over a plurality of lines, the letter string to be printed within a printable area on a print medium by a tape printing apparatus; setting, by using the information processing apparatus, a letter size of the letter string over the plurality of lines, the letter string being entered through the edit screen; and causing, by using the information processing apparatus, the tape printing apparatus to print the letter string over the plurality of lines entered through the edit screen with the set letter size. In setting of the letter size of the letter string over the plurality of lines, the information processing apparatus is configured to differently set letter sizes of the letter string on the respective lines. When a line feed operation is performed at a head or an end of an n-th line through the edit screen, a letter size of the n-th line being preset in accordance with a user's designation, n being an integer equal to or more than one, the information processing apparatus sets a letter size of at least one of the n-th line and an (n+1)-th line after the line feed operation so that a length, in a line direction, of the letter string over the plurality of lines entered through the edit screen is equal to or shorter than a length of the printable area in the line direction, the line direction being orthogonal to an extending direction of the lines.

BRIEF DESCRIPTION OF THE DRAWINGS

FIG. 3 illustrates an example of a label created by the tape printing apparatus.

FIG. 9 is an example of a tape width support table stored in the portable terminal.

DESCRIPTION OF EXEMPLARY EMBODIMENTS

With reference to the accompanying drawings, a description will be given below of an information processing apparatus, a tape printing apparatus, a printing system, a method of controlling such an information processing apparatus, and a program of controlling such an information processing apparatus. It should be noted that some of the drawings employ an X-Y-Z orthogonal coordinate system to facilitate understanding of embodiments that will be described below, and it is not intended to limit the embodiments accordingly.

Figure 1:
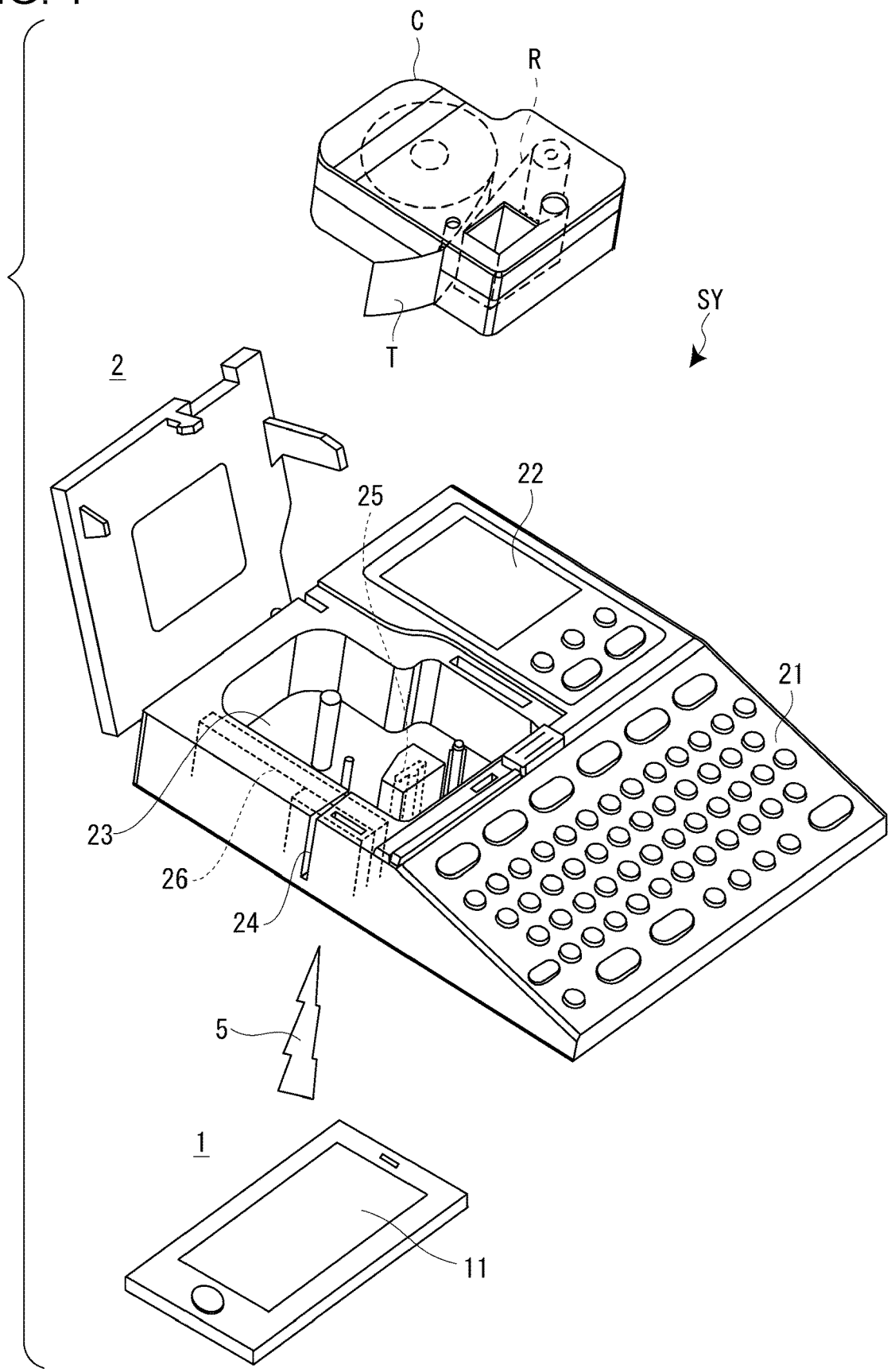
FIG. 1 illustrates appearances of a portable terminal and a tape printing apparatus included in a printing system.

FIG. 1 illustrates the appearances of a portable terminal 1 and a tape printing apparatus 2; the portable terminal 1 is an example of an "information processing apparatus" and the tape printing apparatus 2 is an example of a "tape printing apparatus". The portable terminal 1 and the tape printing apparatus 2 are interconnected via wireless communication 5 to constitute a printing system SY. Instead of the wireless communication 5, the portable terminal 1 and the tape printing apparatus 2 may be interconnected via a physical connecting member, such as a wire or a cable.

The portable terminal 1 has a touch panel 11, which is an example of a "display section". The portable terminal 1 stores a label creation application 30 (see FIG. 2) preinstalled thereon to create a label L (see FIG. 3) in cooperation with the tape printing apparatus 2; the label creation application 30 may be an example of a "program". The portable terminal 1 executes the label creation application 30 to generate print data to be used to create the label L and then transmits this print data to the tape printing apparatus 2. Although the portable terminal 1 is a smartphone in FIG. 1, the portable terminal 1 may also be a tablet terminal or a notebook personal computer (PC). Alternatively, an information processing apparatus other than the portable terminal 1 may generate the print data and then transmit this print data to the tape printing apparatus 2.

The tape printing apparatus 2 includes a keyboard 21, a display 22, a cartridge mounting section 23, and a tape ejection port 24.

The keyboard 21 receives the entry of various operations, such as editing a printed image G (see FIG. 3) to be printed on the label L. In this embodiment, the printed image G to be printed on the label L may be an image of a letter string over a plurality of lines. The display 22 displays various information, such as a screen through which the printed image G is to be edited. The cartridge mounting section 23 can removably accommodate a tape cartridge C, which contains a tape T and an ink ribbon R in its case; the tape T may be an example of a "print medium".

The cartridge mounting section 23 has a thermal head 25, which is thermally driven in accordance with the edit of the printed image G with the tape cartridge C being accommodated in the cartridge mounting section 23. As a result, the ink is transferred the ink ribbon R to the tape T, thereby printing the printed image G on the tape T.

After having printed the printed image G on the tape T, the tape printing apparatus 2 ejects the tape T to the outside via the tape ejection port 24. The tape printing apparatus 2 further includes a cutter 26 between the cartridge mounting section 23 and the tape ejection port 24. The cutter 26 cuts the tape T in a width direction, thereby separating the portion on which the printed image G has been printed from the tape T; this portion is used as the label L.

The tape printing apparatus 2 can print not only an image based on the printed image G that has been edited through the keyboard 21 but also an image based on print data received from the portable terminal 1. In this embodiment, a description will be given regarding a case where the tape printing apparatus 2 prints an image based on the print data received from the portable terminal 1.

Figure 2:
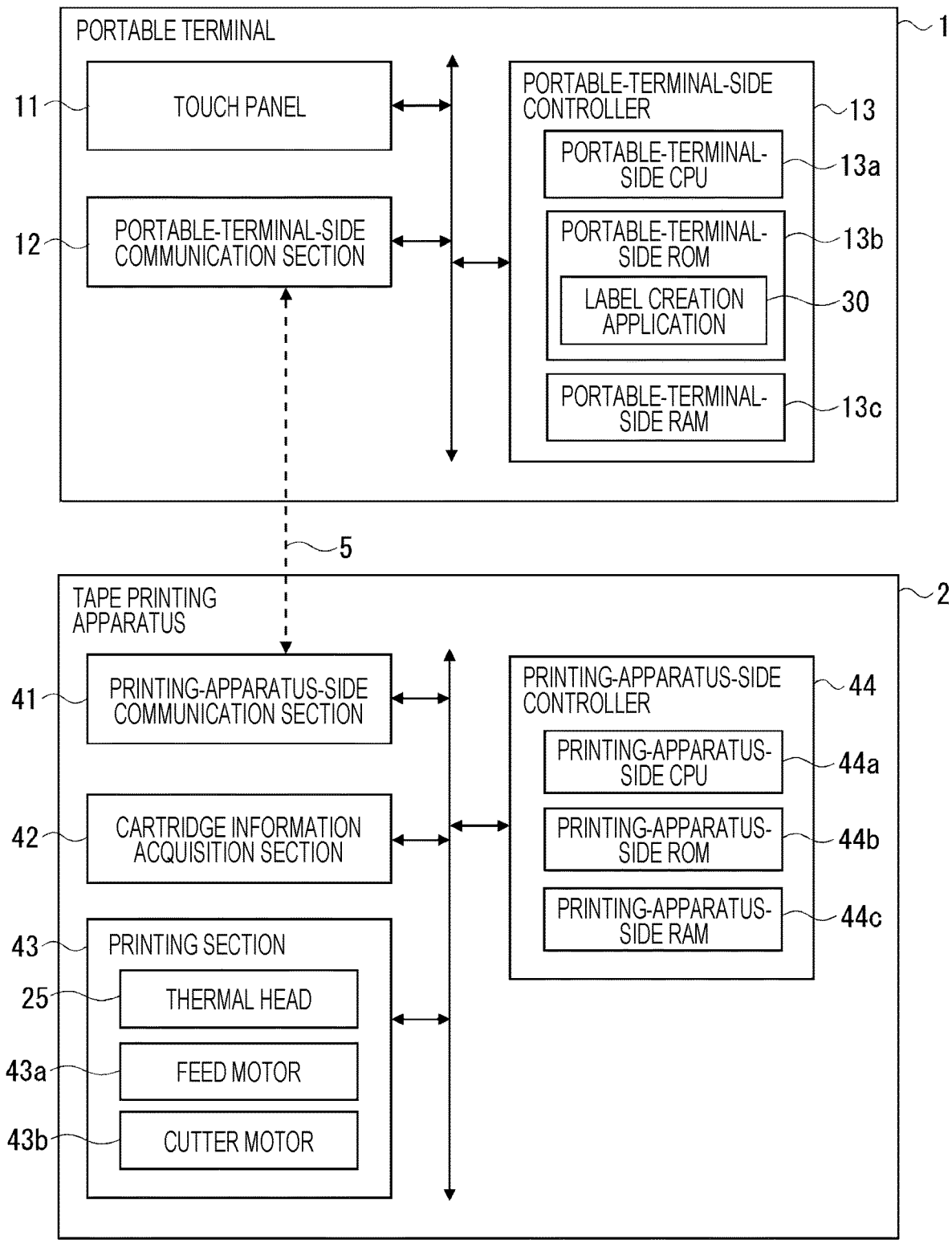
FIG. 2 is a block diagram of hardware configurations of the portable terminal and the tape printing apparatus.

FIG. 2 is a block diagram of hardware configurations of the portable terminal 1 and the tape printing apparatus 2. The portable terminal 1 includes the touch panel 11, a portable-terminal-side communication section 12, and a portable-terminal-side controller 13.

The touch panel 11 receives the entry of various user's operations and displays various information. For example, the touch panel 11 displays an edit screen D1 (see FIG. 8 and others) through which the printed image G is to be edited.

The portable-terminal-side communication section 12 communicates with the tape printing apparatus 2 via the wireless communication 5. For example, the portable-terminal-side communication section 12 transmits the print data to the tape printing apparatus 2 and, in turn, receives cartridge information from the tape printing apparatus 2 which indicates the type of the tape cartridge C accommodated in the tape printing apparatus 2.

The portable-terminal-side controller 13 includes a portable-terminal-side central processing unit (CPU) 13a, portable-terminal-side read-only memory (ROM) 13b, and portable-terminal-side random access memory (RAM) 13c.

The portable-terminal-side CPU 13a reads various control programs from the portable-terminal-side ROM 13b, expands those control programs in the portable-terminal-side RAM 13c, and executes the control programs, thereby performing various control. Instead of the portable-terminal-side CPU 13a, the portable-terminal-side controller 13 may include a hardware circuit such as an application-specific integrated circuit (ASIC) as a processor. In this case, the processor may have a configuration in which one or more CPUs operate in cooperation with a hardware circuit such as an ASIC.

The portable-terminal-side ROM 13b, which may be a rewritable ROM, stores various control programs and control data. For example, the portable-terminal-side ROM 13b stores the label creation application 30, which may be an application program for use in creating the label L as described above.

The tape printing apparatus 2 includes a printing-apparatus-side communication section 41, a cartridge information acquisition section 42, a printing section 43, and a printing-apparatus-side controller 44.

The printing-apparatus-side communication section 41 communicates with the portable terminal 1 via the wireless communication 5.

The cartridge information acquisition section 42 has an optical reader (not illustrated) that optically reads a code image labeled or printed on the case of the tape cartridge C. After the optical reader has read the image, the cartridge information acquisition section 42 decodes this read image to acquire the cartridge information, which may contain the width, color, and material of the tape T contained in the tape cartridge C and the color of the ink ribbon R.

The printing section 43, which may be a mechanism for printing an image on the tape T, includes a thermal head 25, a feed motor 43a, and a cutter motor 43b. The thermal head 25, which may have a plurality of heater elements, thermally transfers the ink from the ink ribbon R to the tape T, thereby printing an image on the tape T. The feed motor 43a serves as a drive source that feeds both the tape T and the ink ribbon R; the cutter motor 43b serves as a drive source for the cutter 26.

The printing-apparatus-side controller 44 includes a printing-apparatus-side CPU 44a, printing-apparatus-side ROM 44b, and printing-apparatus-side RAM 44c.

The printing-apparatus-side CPU 44a reads various control programs from the printing-apparatus-side ROM 44b, expands those control programs in the printing-apparatus-side RAM 44c, and executes the control programs, thereby performing various control. Instead of the printing-apparatus-side CPU 44*a*, the printing-apparatus-side controller 44 may include a hardware circuit such as an ASIC as a processor. In this case, the processor may have a configuration in which one or more CPUs operate in cooperation with a hardware circuit such as an ASIC.

The printing-apparatus-side ROM 44*b* stores various control programs such as firmware. The printing-apparatus-side CPU 44*a* executes a control program stored in the printing-apparatus-side ROM 44*b* to print an image on the tape T based on the print data received from the portable terminal 1. When receiving a cartridge information request signal from the portable terminal 1 or when the tape cartridge C is replaced with another, the printing-apparatus-side CPU 44*a* acquires the cartridge information from the tape cartridge C via the cartridge information acquisition section 42 and then transmits the acquired cartridge information to the portable terminal 1.

Next, with reference to FIG. 3, a description will be given below of the label L created by the tape printing apparatus 2. FIG. 3 illustrates an example of the label L on which the printed image G of a letter string over a plurality of lines is printed. In FIG. 3, the +X direction corresponds to a length direction of the tape T; the +Y direction corresponds to a width direction of the tape T; and the +Z direction corresponds to a thickness direction of the tape T. In this embodiment, the letter string over the plurality of lines is printed on the label L so that a plurality of letter lines are arranged in the width direction of the tape T, or in the +Y direction, which is an example of a "line direction". On the edit screen D1 that will be described later, the length direction of the tape T also corresponds to the +X direction; and the width direction of the tape T also corresponds to the +Y direction.

The tape T includes: a print layer Ta; and a release paper layer Tb formed on the −Z-directional side of the print layer Ta. The +Z-directional side of the print layer Ta corresponds to the printed surface, whereas the −Z-directional side of the print layer Ta corresponds to the adhesive surface to which a bonding agent is applied. After the printed image G has been printed on the tape T of the label L, the release paper layer Tb is separated from the print layer Ta, and the print layer Ta is then bonded to the surface of a desired object (not illustrated).

The printed image G is printed within a printable area PE on the tape T; the printable area PE is a rectangular region defined by the broken line in FIG. 3. In this case, a length L3 of the printable area PE in the +X direction is equal to the value obtained by subtracting a length L5*a* of a front margin, which is the margin of the tape T on the −X-directional side, and a length L5*b* of a rear margin, which is the margin of the tape T on the +X-directional side, from a length L1 of the tape T. Each of the length L5*a* of the front margin and the length L5*b* of the rear margin may be constant. If the tape printing apparatus 2 operates in a fixed-length printing mode to create the label L having a designated length, the length L3 of the printable area PE in the +X direction depends on the designated length. If the tape printing apparatus 2 operates in a flexible length printing mode to create the label L having a variable length in accordance with a letter string entered through the edit screen D1, the length L3 of the printable area PE in the +X direction depends on the number and size of letters entered.

A length L4 of the printable area PE in the +Y direction is equal to the value obtained by subtracting a length L6*a* of an upper margin, which is the margin of the tape T on the +Y-directional side, and a length L6*b* of a lower margin, which is the margin on the −Y-directional side, from a width L2 of the tape T. Each of the length L6*a* of the upper margin and the length L6*b* of the lower margin may be constant. The length L4 of the printable area PE in the +Y direction depends on the width of the tape T.

Next, with reference to FIG. 4, a functional configuration of the portable terminal 1 will be described below. The functional configuration of the portable terminal 1 includes a display controller 110, a letter-size setting section 120, and a print controller 130. This functional configuration is realized by the portable-terminal-side CPU 13*a* executing the label creation application 30.

The display controller 110 causes the touch panel 11 to display the edit screen D1, through which a letter string over a plurality of lines to be printed within the printable area PE on the tape T by the tape printing apparatus 2 can be edited. In addition, the display controller 110 causes the edit screen D1 to display a tape image 64, which is a mimic image of the tape T, a letter string image CI, which is an image of a letter string over one or more lines to be edited, and a cursor K, which indicates an edit point (see FIG. 8 and others).

The letter-size setting section 120 sets the letter size of a letter string that has been entered in the portable terminal 1 through the edit screen D1. When a letter string over a plurality of lines is entered through the edit screen D1, the letter-size setting section 120 can set the letter sizes of this letter string on the respective lines. For example, if a user designates the letter size of a letter string on a certain line, the letter-size setting section 120 sets this letter size to the designated size. If the user does not designate the letter size of a letter string on a certain line, the letter-size setting section 120 automatically sets this letter size.

The express "automatically set a letter size of a letter string over a plurality of lines" refers to, if the letter size of a plurality of lines is not designated by a user, automatically setting this letter size so that the length, in the line direction (+Y direction), of the letter string entered through the edit screen D1 to be equal to or shorter than the length of the printable area PE in the +Y direction. More specifically, if the letter size of a certain line is not designated by the user, the letter-size setting section 120 sets the letter size of a letter string on this line so that the letter string maximally expands in the +Y direction across the area defined by subtracting the area occupied by the designated line from the printable area PE. Furthermore, if the letter sizes of a letter strings over a plurality of lines are designated by the user, the letter-size setting section 120 sets those letter sizes to the same value.

When the tape printing apparatus 2 is instructed by the user to perform a fixed-length packing function while operating in the fixed-length printing mode, the letter-size setting section 120 determines the letter size of a line to be automatically set, in accordance with the designated length of the tape T. The fixed-length packing function refers to a function by which, when the total length, in the +X direction, of one or more paragraphs entered through the edit screen D1 exceeds a designated length, the letter size of each paragraph is automatically set such that the total length of the paragraphs is equal to or shorter than the designated length. In this case, a paragraph refers to a single line or a group of a plurality of lines. When receiving the entry of a plurality of paragraphs through the edit screen D1, the portable terminal 1 arranges these paragraphs on the tape T in the +X direction. When the portable terminal 1 is instructed to perform the fixed-length packing function, the letter-size setting section 120 gradually decreases the letter size of the letter strings in the designated paragraph from the +X side to the −X side of the tape T. However, if the letter size of a line in a paragraph on which the fixed-length packing function is to be performed is designated by the user, the letter-size setting section 120 does not change the letter size of this line and changes only the letter size of lines to be automatically set. Furthermore, if a line whose letter size has been designated by the user is longer in the +X direction than any other line in the paragraph, the fixed-length packing function is not performed on this paragraph.

In the case where the user performs the line feed operation on an n-th (n: integer≥1) line for which the letter size has been set in accordance with the user's designation through the edit screen D1, the letter-size setting section 120 may automatically set the letter size of at least one of the n-th and (n+1)-th lines after the line feed operation.

More specifically, in the case where the user performs the line feed operation at the head of the n-th line on which a letter has been entered, the letter-size setting section 120 automatically sets the letter size of the n-th line and then sets the letter size of the (n+1)-th line after the line feed operation to the letter size of the n-th line which has been set before the line feed operation. The head of the n-th line refers to a location on the n-th line at which no letters are present on the left of a cursor K placed thereon.

In the case where the user performs the line feed operation at the end of the n-th line, the letter-size setting section 120 sets the letter size of the n-th line to the letter size of the n-th line which has been set before the line feed operation and then automatically sets the letter size of the (n+1)-th line after the line feed operation. The end of the n-th line refers to a location on the n-th line at which no letters are present on the right of a cursor K placed thereon.

In the case where the user performs the line feed operation in the middle of the n-th line, the letter-size setting section 120 sets the letter size of the n-th and (n+1)-th lines after the line feed operation to the letter size of the n-th line which has been set before the line feed operation. The middle of the n-th line refers to any location on the n-th line except the head and the end.

When the user performs the line feed operation on the n-th line whose letter size has not been designated, namely, whose letter size is to be automatically set, the letter-size setting section 120 automatically sets the letter size of both the n-th and (n+1)-th lines after the line feed operation.

The print controller 130 causes the tape printing apparatus 2 to print a letter string over a plurality of lines entered through the edit screen D1, in accordance with the letter sizes that have been set in the above manner by the letter-size setting section 120. More specifically, the print controller 130 generates print data for use in printing the letter string over the plurality of lines entered through the edit screen D1 in the letter sizes that have been set by the letter-size setting section 120 and then transmits the generated print data to the tape printing apparatus 2.

Next, with reference to FIGS. 5 to 7, a description will be given below of a letter-size setting process performed by the letter-size setting section 120 in the portable terminal 1. This letter-size setting process is performed in response to any user's operation through the edit screen D1 displayed by the touch panel 11 in the portable terminal 1.

Figure 5:
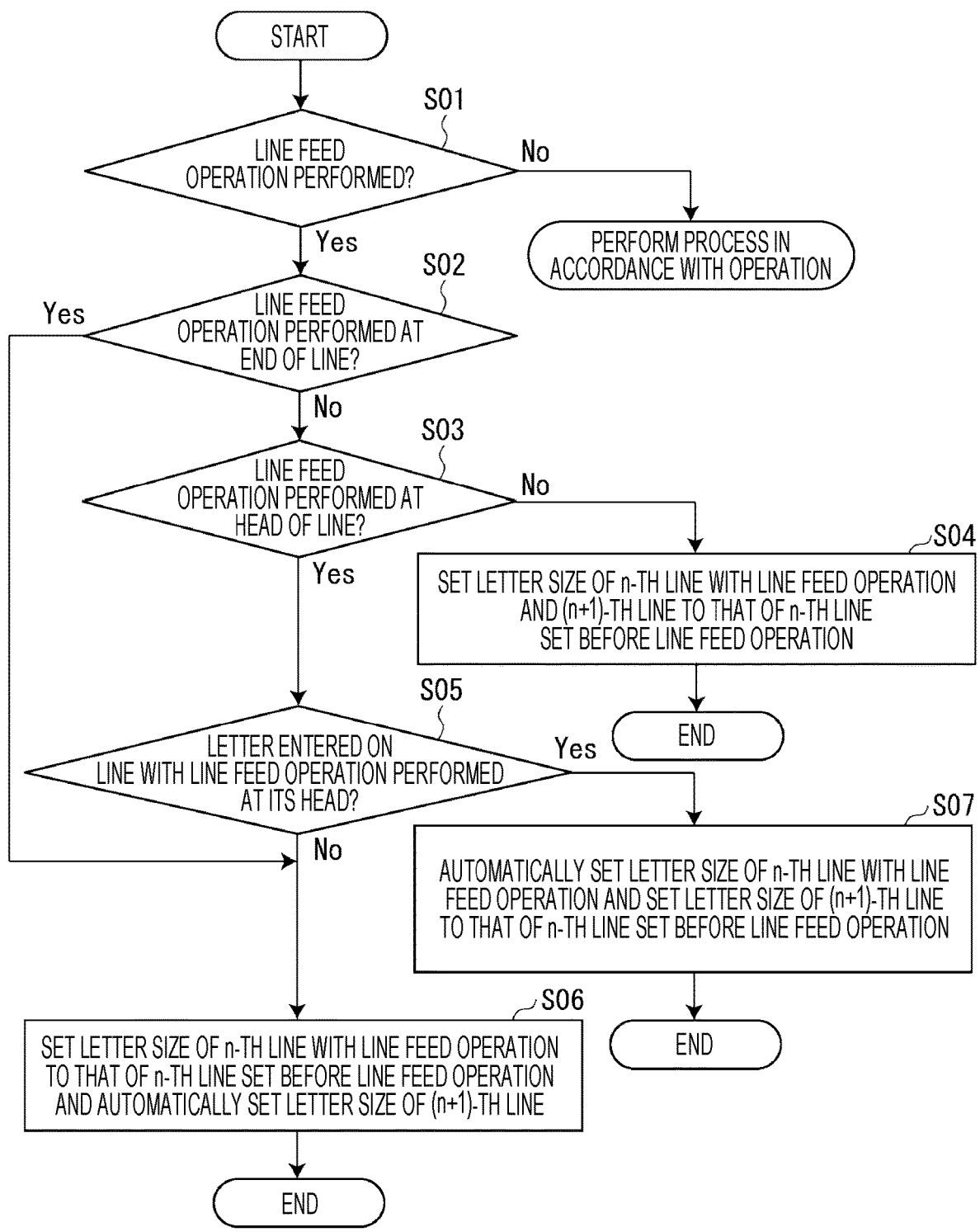
FIG. 5 is a flowchart of a letter-size setting process performed by the portable terminal in response to a line feed operation.

FIG. 5 is a flowchart of the letter-size setting process performed in response to the line feed operation. At Step S01, the portable terminal 1 determines whether the user has performed the line feed operation. When determining that the user has performed the line feed operation (Yes at Step S01), the portable terminal 1 makes the process proceed to Step S02. When determining that the user has not performed the line feed operation (No at Step S01), the portable terminal 1 performs the process in accordance with the user's operation.

At Step S02, the portable terminal 1 determines whether the line feed operation has been performed at the end of a line. When determining that the line feed operation has been performed at the end of a line (Yes at Step S02), the portable terminal 1 makes the process proceed to Step S06. When determining that the line feed operation has not been performed at the end of a line (No at Step S02), the portable terminal 1 makes the process proceed to Step S03.

At Step S03, the portable terminal 1 determines whether the line feed operation has been performed at the head of a line. When determining that the line feed operation has been performed at the head of a line (Yes at Step S03), the portable terminal 1 makes the process proceed to Step S05. When determining that the line feed operation has not been performed at the head of a line (No at Step S03), the portable terminal 1 makes the process proceed to Step S04.

If the line feed operation has been performed on the n-th line, at Step S04, the portable terminal 1 sets the letter size of both the n-th and (n+1)-th lines to the letter size of the n-th which has been set before the line feed operation. The expression "set the letter size of both the n-th and (n+1)-th lines to the letter size of the n-th which has been set before the line feed operation" means that, when the letter size of the n-th line is designated by the user, the portable terminal 1 sets the letter size to the designated size, and when the letter size of the n-th line is not designated by the user, the portable terminal 1 automatically sets the letter size.

At Step S05, the portable terminal 1 determines whether a letter has been entered on the line, at the head of which the line feed operation has been performed. When the portable terminal 1 determines that a letter has been entered on the line, at the head of which the line feed operation has been performed (Yes at Step S05), the portable terminal 1 makes the process proceed to Step S07. When the portable terminal 1 determines that no letter has been entered on the line, at the head of which the line feed operation has been performed (No at Step S05), the portable terminal 1 makes the process proceed to Step S06.

If the line feed operation has been performed on the n-th line, at Step S06, the portable terminal 1 sets the letter size of the n-th line to the letter size of the n-th line which has been set before the line feed operation and automatically sets the letter size of the (n+1)-th line.

If the line feed operation has been performed on the n-th line, at Step S07, the portable terminal 1 automatically sets the letter size of the n-th line and sets the letter size of the (n+1)-th line to the letter size of the n-th line which has been set before the line feed operation.

Figure 6:
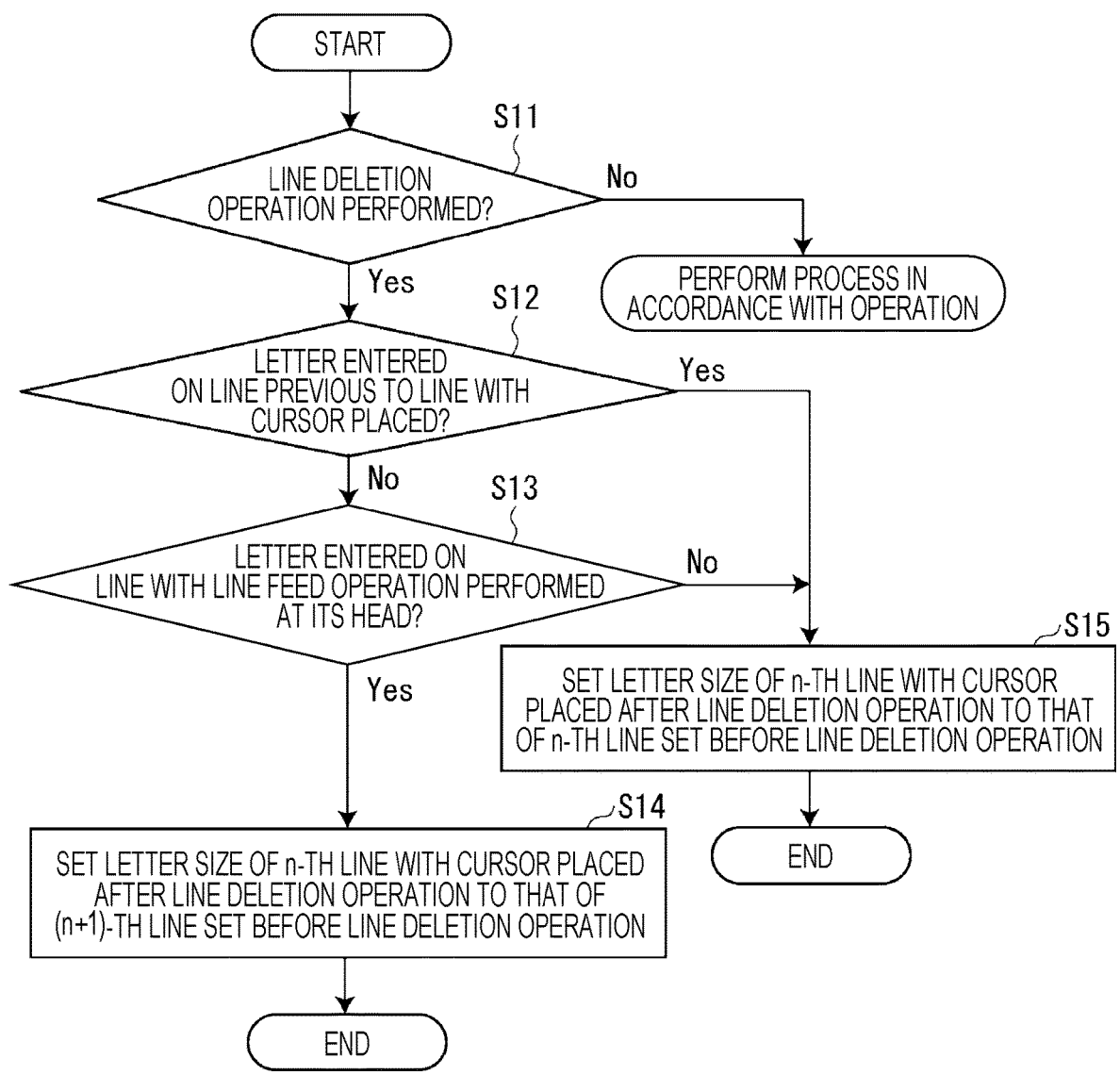
FIG. 6 is a flowchart of the letter-size setting process performed by the portable terminal in response to a line deletion operation.

FIG. 6 is a flowchart of the letter-size setting process performed in response to a line deletion operation. The line deletion operation refers to a line deletion operation performed when the cursor K is placed at the head of a line. For example, when the line deletion operation is performed on the (n+1)-th line, the portable terminal 1 moves the letter string on the (n+1)-th line to the end of the n-th line.

At Step S11, the portable terminal 1 determines whether the user has performed the line deletion operation. When determining that the user has performed the line deletion operation (Yes at Step S11), the portable terminal 1 makes the process proceed to Step S12. When determining that the user has not performed the line deletion operation (No at Step S11), the portable terminal 1 performs the process in accordance with the user's operation.

At Step S12, the portable terminal 1 determines whether a letter has been entered on the line previous to the line on which the cursor K is placed. When determining that a letter has been entered on the line previous to the line on which the cursor K is placed (Yes at Step S12), the portable terminal 1 makes the process proceed to Step S15. When determining that no letter has been entered on the line previous to the line on which the cursor K is placed (No at Step S12), the portable terminal 1 makes the process proceed to Step S13.

At Step S13, the portable terminal 1 determines whether a letter has been entered on the line, at the head of which the line feed operation has been performed. When determining that a letter has been entered on the line, at the head of which the line feed operation has been performed (Yes at Step S13), the portable terminal 1 makes the process proceed to Step S14. When determining that no letter has been entered on the line, at the head of which the line feed operation has been performed (No at Step S13), the portable terminal 1 makes the process proceed to Step S15.

At Step S14, the portable terminal 1 sets the letter size of the n-th line on which the cursor K is placed after the line deletion operation to the letter size of the (n+1)-th line which has been set before the line deletion operation.

At Step S15, the portable terminal 1 sets the letter size of the n-th line on which the cursor K is placed after the line deletion operation to the letter size of the n-th line which has been set before the line deletion operation.

Figure 7:
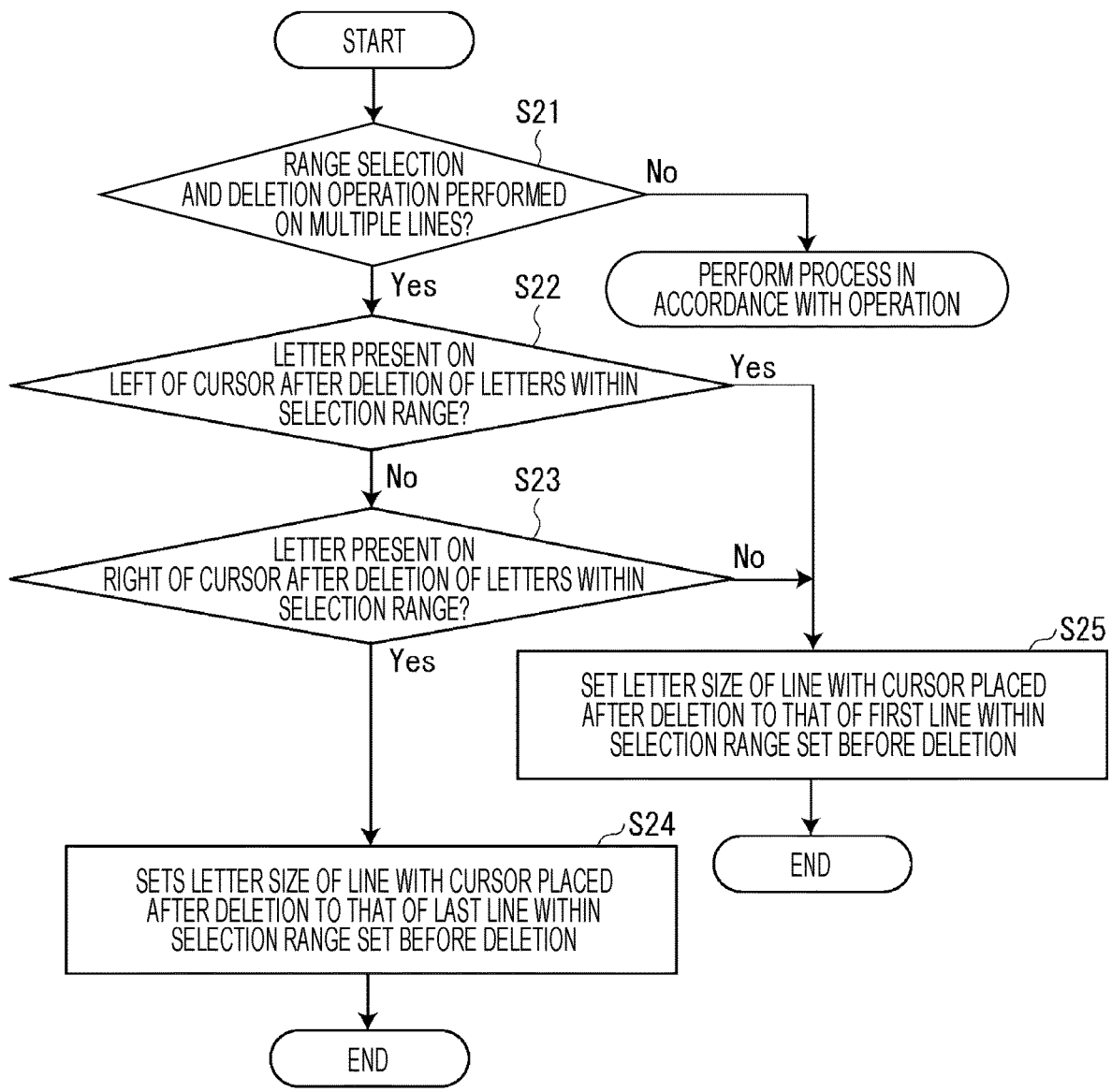
FIG. 7 is a flowchart of the letter-size setting process performed by the portable terminal in response to a range selection and deletion operation on a plurality of lines.

FIG. 7 is a flowchart of the letter-size setting process performed in response to a range selection and deletion operation on a plurality of lines. The range selection and deletion operation on a plurality of lines refers to a delete operation performed on a plurality of lines within a selected range.

At Step S21, the portable terminal 1 determines whether the user has performed the range selection and deletion operation on a plurality of lines. When determining whether the user has performed the range selection and deletion operation on a plurality of lines (Yes at Step S21), the portable terminal 1 makes the process proceed to Step S22. When determining whether the user has not performed the range selection and deletion operation on a plurality of lines (No at Step S21), the portable terminal 1 performs the process in accordance with the user's operation.

At Step S22, the portable terminal 1 determines whether a letter is present on the left of the cursor K after letters within a selection range 81 (see FIG. 28 and others) have been deleted. The expression "a letter is present on the left of the cursor K after letters within a selection range 81 have been deleted" means that a letter is present on the left of the cursor K placed on a line after a letter within the selection range 81 has been deleted. When determining that a letter is present on the left of the cursor K after the letters within the selection range 81 have been deleted (Yes at Step S22), the portable terminal 1 makes the process proceed to Step S25. When determining that no letter is present on the left of the cursor K after the letters within the selection range 81 have been deleted (No at Step S22), the portable terminal 1 makes the process proceed to Step S23.

At Step S23, the portable terminal 1 determines whether a letter is present on the right of the cursor K after the letters within the selection range 81 have been deleted. The expression "a letter is present on the right of the cursor K after the letters within the selection range 81 have been deleted" means that a letter is present on the right of the cursor K placed on a line after the letters within the selection range 81 have been deleted. When determining that a letter is present on the right of the cursor K after the letters within the selection range 81 have been deleted (Yes at Step S23), the portable terminal 1 makes the process proceed to Step S24. When determining that no letter is present on the right of the cursor K after the letters within the selection range 81 have been deleted (No at Step S23), the portable terminal 1 makes the process proceed to Step S25.

At Step S24, the portable terminal 1 sets the letter size of the line on which the cursor K is placed after the deletion to the letter size of the last line within the selection range 81 which has been set before the deletion.

At Step S25, the portable terminal 1 sets the letter size of the line on which the cursor K is placed after the deletion to the letter size of the first line within the selection range 81 which has been set before the deletion.

Figure 8:
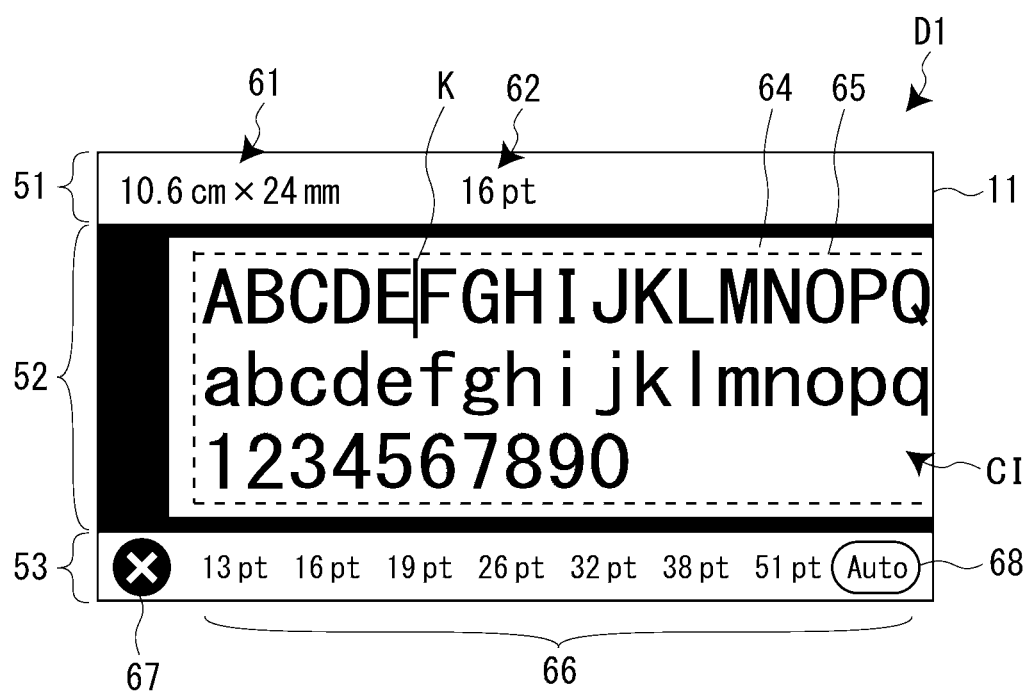
FIG. 8 illustrates an example of an edit screen displayed by the portable terminal.

Next, with reference to FIGS. 8 to 11, a description will be given below of the edit screen D1 displayed by the touch panel 11 in the portable terminal 1. As illustrated in FIG. 8, the edit screen D1 includes: a first area 51 at an upper location; a second area 52 at a middle location; and a third area 53 at a lower location. The touch panel 11 displays tape size information 61 and letter size information 62 within the first area 51.

Figure 10:
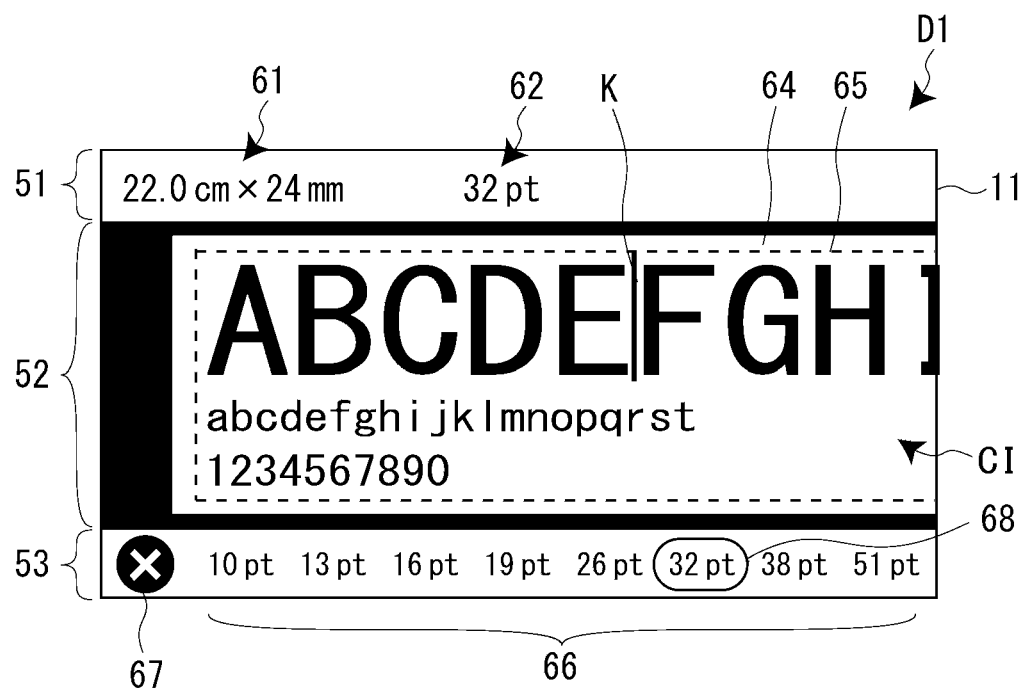
FIG. 10 illustrates an example of the edit screen displayed by the portable terminal when the letter size of the first line which has been in the state of FIG. 8 is increased.

The tape size information 61 may be information that indicates a length L1 and a width L2 of the tape T if a letter string being edited is printed on the tape T (see FIG. 3). Examples of the length L1 of the tape T are illustrated in FIGS. 8 and 10 when the tape printing apparatus 2 operates in the flexible length printing mode. In this case, the portable terminal 1 varies the length L1 of the tape T in the tape size information 61, in accordance with an editing result displayed within the second area 52 (described later). In addition, the portable terminal 1 also displays the width L2 of the tape T in the tape size information 61, based on the information indicating the tape width which is contained in the cartridge information received from the tape printing apparatus 2. When the tape cartridge C accommodated in the tape printing apparatus 2 is replaced with another, the portable terminal 1 changes the width L2 of the tape T in the letter size information 62. The letter size information 62 may be information indicating a letter size at the location of the cursor K displayed within the second area 52, or at an edit location.

The portable terminal 1 displays, within the second area 52, the tape image 64, which is a mimic image of the tape T, a paragraph area 65 that indicates the range of a paragraph, the letter string image CI, which indicates a letter string to be edited over one or more lines, and the cursor K, which indicates the edit location. The label creation application 30 displays a plurality of paragraphs arranged in the +X direction, which enables the user to create any given number of lines and differently edit and design paragraphs on a single label L. The touch panel 11 displays the tape image 64 so that its tape width maximally expands in the +Y direction across the second area 52, based on the information indicating the tape width contained in the cartridge information.

FIG. 8 illustrates an example of a letter string to be edited which forms a single paragraph. In this case, the paragraph area 65 corresponds to the printable area PE (see FIG. 3) of the tape T. When the letter string to be edited forms a single paragraph, the paragraph area 65 is equivalent to the area by subtracting the length L5a, which is the front margin in the +X direction, and the length L5b, which is the rear margin in the +X direction, the length L6a, which is the upper margin in the +Y direction, and the length L6b, which is the lower margin in the +Y direction, from the entire area of the label L. In this case, the user can edit the letter string only within the paragraph area 65.

In the example of FIG. 8, the letter string is entered over three lines, and the letter size is set to "16 pt". Although the letter string image CI is partly lacking in the length direction of the tape T in the example of FIG. 8, the user can see the entire letter string image CI by moving the cursor K in the right or left direction.

The portable terminal 1 displays, within the third area 53, selections 66 of the letter size which include manual selections and an automatic selection. Each manual selection is, of letter sizes supported by the label creation application 30, one that can be printed on the tape T having a tape width displayed within the first area 51. When the user selects the automatic selection, the portable terminal 1 automatically sets the letter size. By default, the portable terminal 1 may automatically set the letter size. Hereinafter, the expression "the user designates a letter size" means that the user selects one of the manual selections except the automatic selection included in the selections 66.

With reference to FIG. 9 that illustrates an example of a tape width support table 50, the manual selections will be described below. The tape width support table 50 is a portion of the label creation application 30 which is stored in the portable terminal 1. The tape width support table 50 lists supported letter sizes in relation to a plurality of tape widths. As an example, when the tape T has a tape width of 36 mm, all the letter sizes indicated by the tape width support table 50 are printable. As another example, when the tape T has a tape width of 24 mm, all the letter sizes, except "64 pt" and "79 pt", indicated by the tape width support table 50 are printable. When the portable terminal 1 prints an image on a tape T having a tape width of 24 mm as in the example of FIG. 8, the portable terminal 1 displays all the letter sizes, except "64 pt" and "79 pt", indicated by the tape width support table 50 as the manual selections included in the selections 66.

As illustrated in FIG. 8, the portable terminal 1 displays one of the manual selections included in the selections 66 which has been selected by the user and also displays a selection box 68 around this manual selection within the third area 53. In the example of FIG. 8, the selection box 68 surrounds the automatic selection, which means that the portable terminal 1 automatically sets the letter size of the first line on which the cursor K is placed. Although only the seven manual selections are displayed as the selections 66 in addition to the automatic selection, the user can see other manual selections supported for the tape T having a tape width of 24 mm by sliding the selection box 68 in the +X or –X direction.

When receiving the selection of an X mark 67 within the third area 53, the portable terminal 1 hides the selections 66 and, in turn, displays a functional button group (not illustrated) within the third area 53. This functional button group may contain buttons for use in selecting the decoration of letters and adding a new paragraph. When the portable terminal 1 receives the selection of the letter size information 62 after having displayed the functional button group within the third area 53, the portable terminal 1 hides this functional button group and, in turn, displays the selections 66 within the third area 53.

In the example of FIG. 8, the portable terminal 1 automatically sets the letter size of the letter string over three lines, which has been entered and is displayed within the second area 52. In this case, the portable terminal 1 sets the letter size of the letter string over one or more lines to be automatically set so that these lines maximally expand in the +Y direction across the printable area PE, as described above. Furthermore, the portable terminal 1 sets the letter sizes of those lines to the same value, as described above. In the example of FIG. 8, the letter size information 62 indicates that the letter size of the letter string over the three lines is set to "16 pt".

FIG. 10 illustrates an example of the edit screen D1 when the letter size of the first line which has been in the state of FIG. 8 is increased to "32 pt". By placing the cursor K on the first line as illustrated in FIG. 8 and selecting the manual selection "32 pt" from among the manual selections included in the selections 66, the user can increase the letter size of the first line to "32 pt". In response to the increase in the letter size of the first line from "16 pt" to "32 pt", the portable terminal 1 decreases the letter sizes of the second and third lines. In this case, the portable terminal 1 sets the letter sizes of the second and third lines to the same value. Moreover, in response to the increase in the letter size of the first line, the portable terminal 1 updates the length L1 in the tape size information 61.

Figure 11:
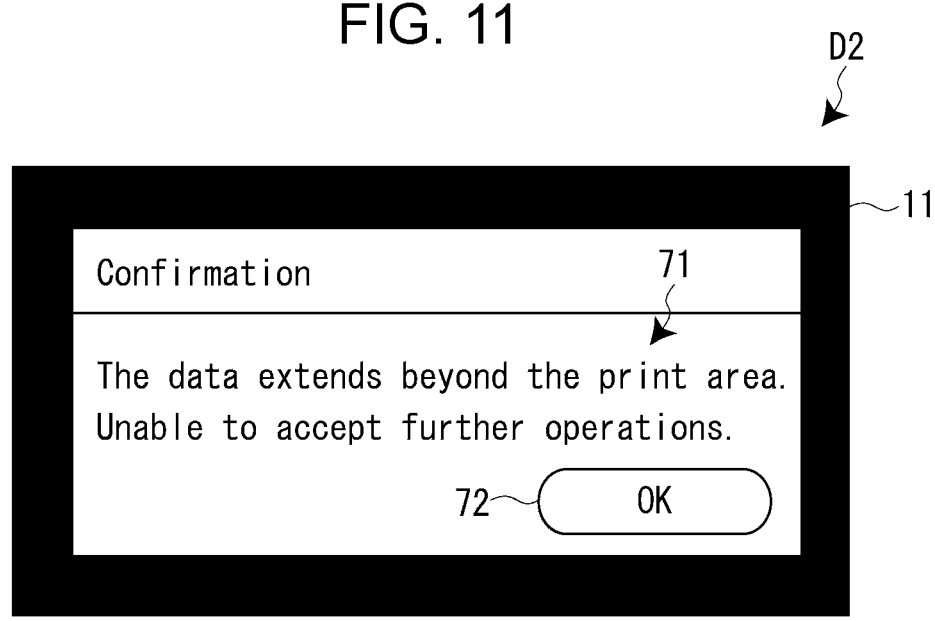
FIG. 11 illustrates an example of an error display screen displayed by the portable terminal.

FIG. 11 illustrates an example of an error display screen D2, which appears when the user edits a letter string over one or more lines through the edit screen D1 so that the length, in the +X direction, of the printed image G of the letter string exceeds the length of the printable area PE in the +X direction or so that the length, in the +Y direction, of the printed image G of the letter string exceeds the length of the printable area PE in the +Y direction. For example, when the user increases the letter size of a letter string on one of the first to third lines in the state of FIG. 10 so that the total length of the three lines in the +Y direction exceeds the length of the printable area PE in the +Y direction, the portable terminal 1 displays the error display screen D2.

The error display screen D2 contains an error message 71 and an OK button 72. The error message 71 may be a message that warns the user that the size of the printed image G exceeds the size of the printable area PE. When receiving the selection of the OK button 72, the portable terminal 1 hides the error display screen D2 and, in turn, displays the edit screen D1 on the touch panel 11.

Next, with reference to FIGS. 12 to 19, a description will be given below of the edit screen D1 when the line feed operation is performed. The description will be given regarding a case where the portable terminal 1 operates in the fixed-length printing mode and the tape size information 61 indicates that the tape T has a constant length of "30.0 cm".

Figure 12:
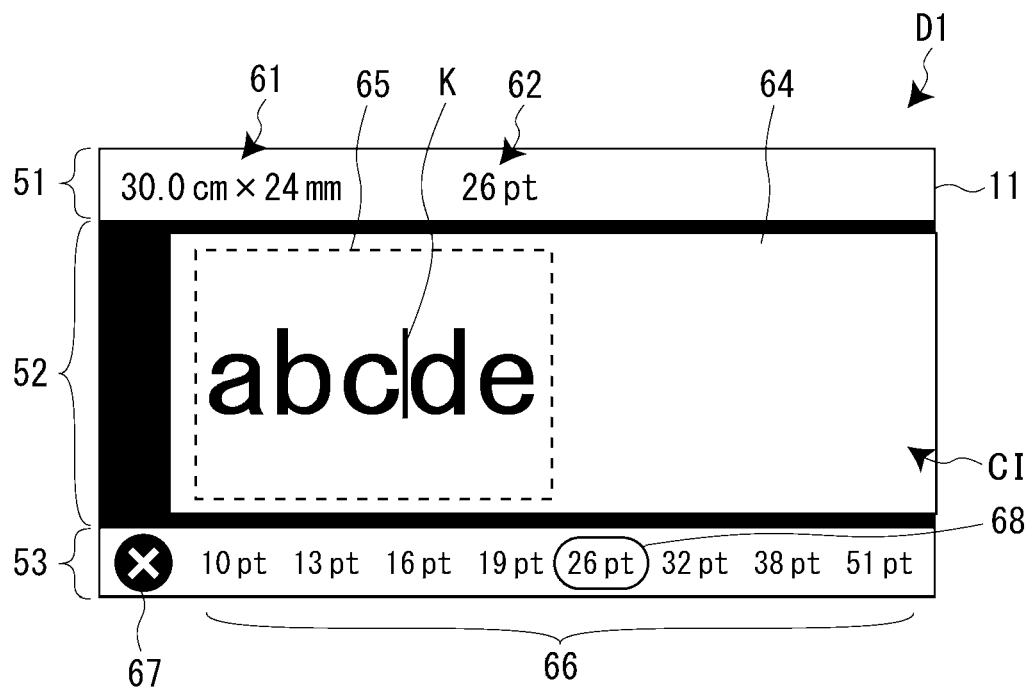
FIG. 12 illustrates another example of the edit screen.
Figure 13:
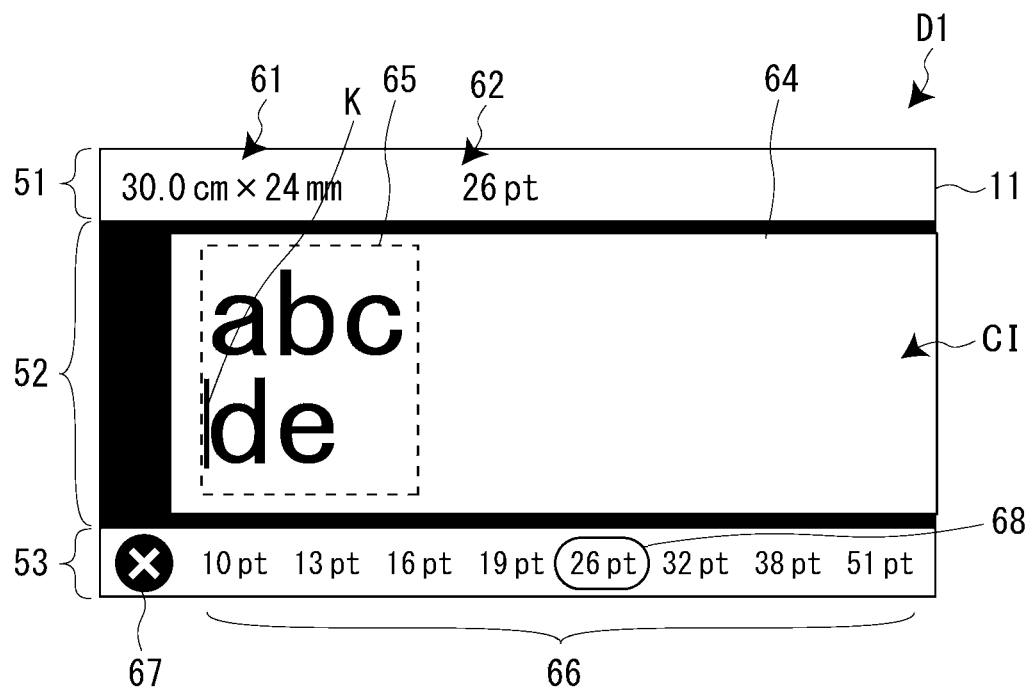
FIG. 13 illustrates an example of the edit screen displayed when the line feed operation is performed in the state of FIG. 12.

On the edit screen D1 of FIG. 12, the letter size on the first line is set to "26 pt", and the cursor K is placed in the middle of the letter string. FIG. 13 illustrates the edit screen D1 when the line feed operation is performed in the state of FIG. 12. When the line feed operation is performed, as illustrated in FIG. 13, the portable terminal 1 sets the letter size of the second line after the line feed operation to "26 pt", which is equal to the letter size of the first line which has been set before the line feed operation. In addition, the portable terminal 1 also sets the letter size of the first line after the line feed operation to "26 pt", which is equal to the letter size of the first line which has been set before the line feed operation, although this is not illustrated in FIG. 13. Thus, when the cursor K moves to the first line in the state of FIG. 13, the portable terminal 1 displays the selection box 68 around "26 pt" within the third area 53 to indicate the letter size is set to "26 pt". The letter-size setting process performed when the state of FIG. 12 is changed to the state of FIG. 13 in response to the line feed operation corresponds to Step S04 in FIG. 5.

Figure 14:
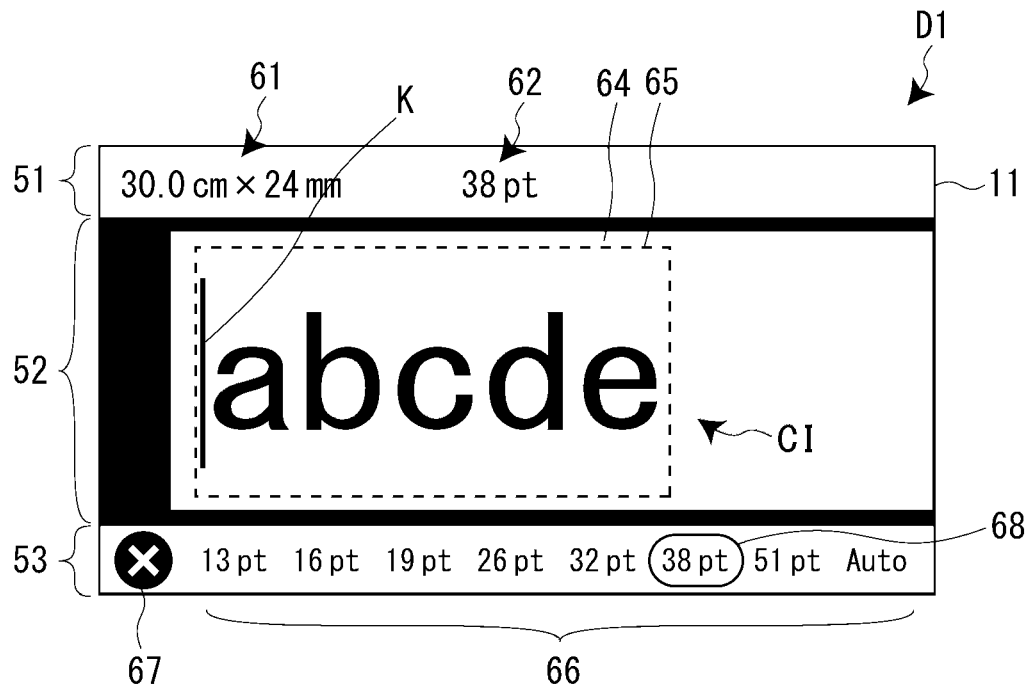
FIG. 14 illustrates another example of the edit screen.
Figure 15:
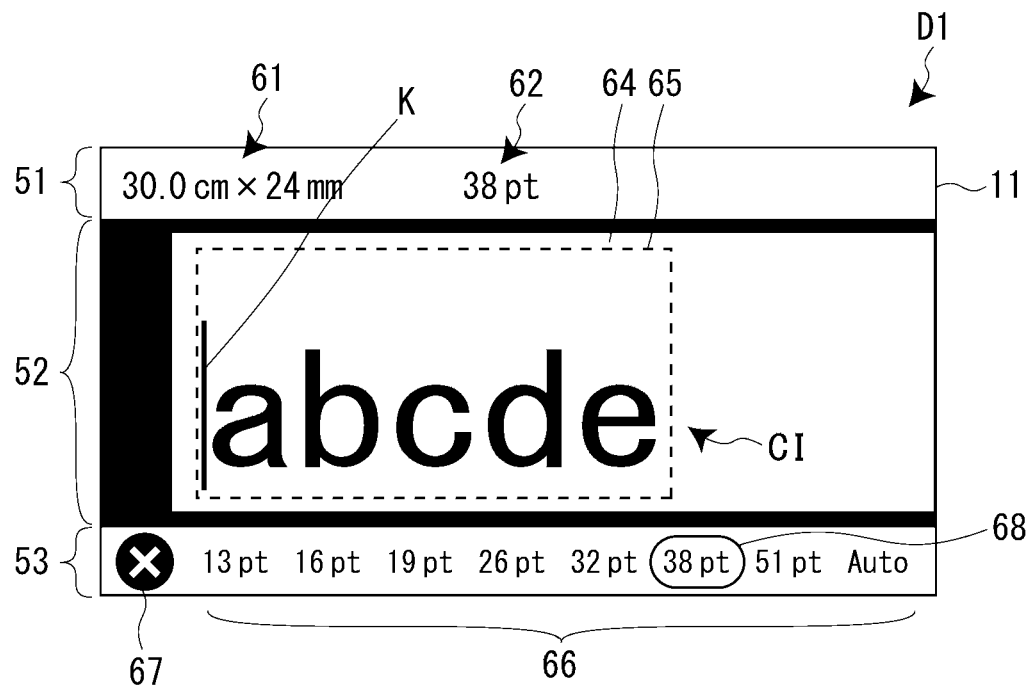
FIG. 15 illustrates an example of the edit screen when the line feed operation is performed in the state of FIG. 14.

FIG. 14 illustrates the edit screen D1 on which a letter string has been entered on the first line with its letter size set to "38 pt", and the cursor K is placed at the head of this letter string. FIG. 15 illustrates the edit screen D1 after the line feed operation has been performed in the state of FIG. 14. As illustrated in FIG. 15, the portable terminal 1 sets the letter size of the second line after the line feed operation to "38 pt", which is equal to the letter size of the first line which has been set before the line feed operation. In addition, the portable terminal 1 automatically sets the letter size of the first line after the line feed operation, although this is not illustrated in FIG. 15. Thus, when the cursor K moves to the first line in the state of FIG. 15, the portable terminal 1 displays the selection box 68 around "Auto" within the third area 53 to indicate that the letter size is automatically set. The letter-size setting process performed when the state of FIG. 14 is changed to the state of FIG. 15 in response to the line feed operation corresponds to Step S07 in FIG. 5.

Figure 16:
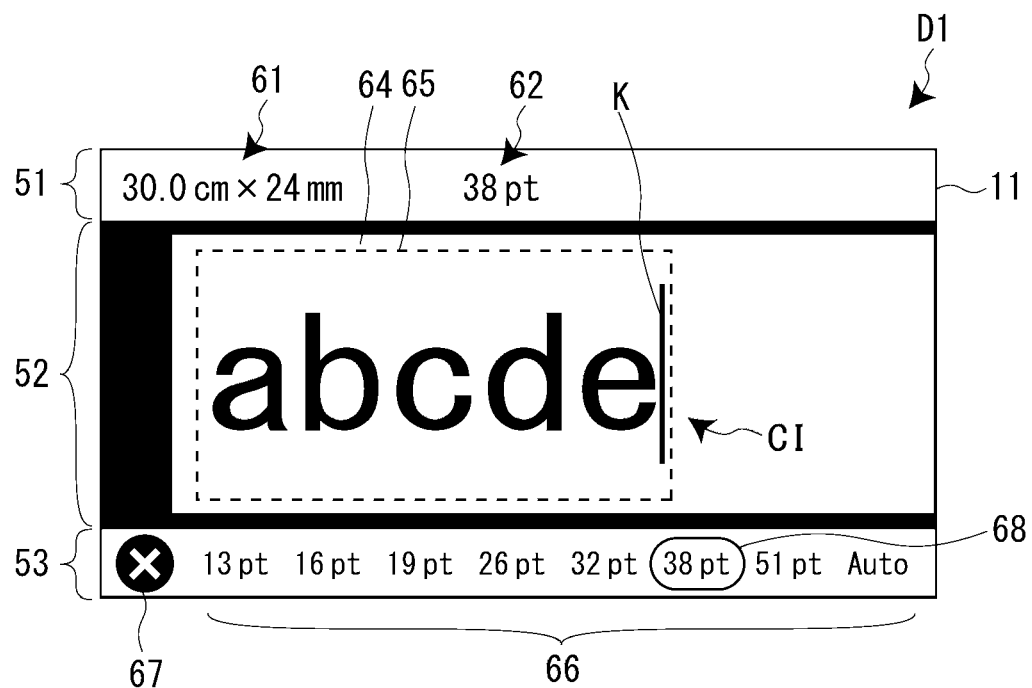
FIG. 16 illustrates another example of the edit screen.
Figure 17:
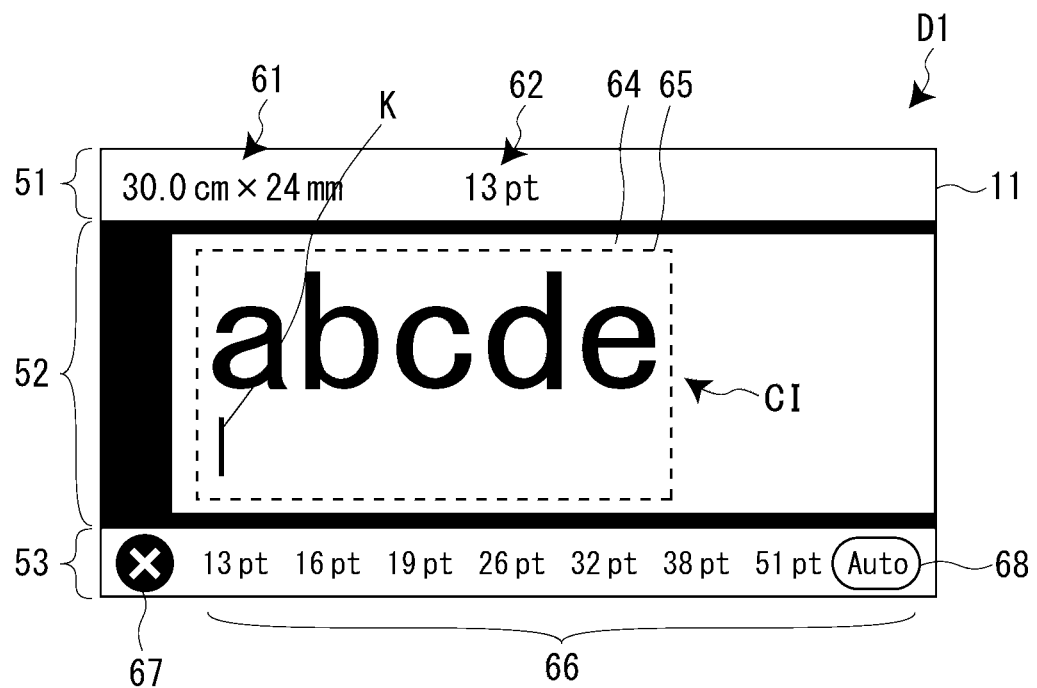
FIG. 17 illustrates an example of the edit screen when the line feed operation is performed in the state of FIG. 16.

FIG. 16 illustrates the edit screen D1 on which a letter string has been entered along the first line with its letter size set to "38 pt", and the cursor K is placed at the end of the first line. FIG. 17 illustrates the edit screen D1 after the line feed operation has been performed in the state of FIG. 16. As illustrated in FIG. 17, the portable terminal 1 automatically sets the letter size of the second line after the line feed operation. In this case, the portable terminal 1 automatically sets the letter size of the second line after the line feed operation is to the "13 pt", as indicated by the letter size information 62. In addition, the portable terminal 1 sets the letter size of the first line after the line feed operation to "38 pt", which is equal to the letter size of the first line which has been set before the line feed operation, although this is not illustrated in FIG. 17. Thus, when the cursor K moves to the first line in the state of FIG. 17, the portable terminal 1 displays the selection box 68 around "38 pt" within the third area 53 to indicate the letter size is set to "38 pt". The letter-size setting process performed when the state of FIG. 16 is changed to the state of FIG. 17 in response to the line feed operation corresponds to Step S06 in FIG. 5.

Figure 18:
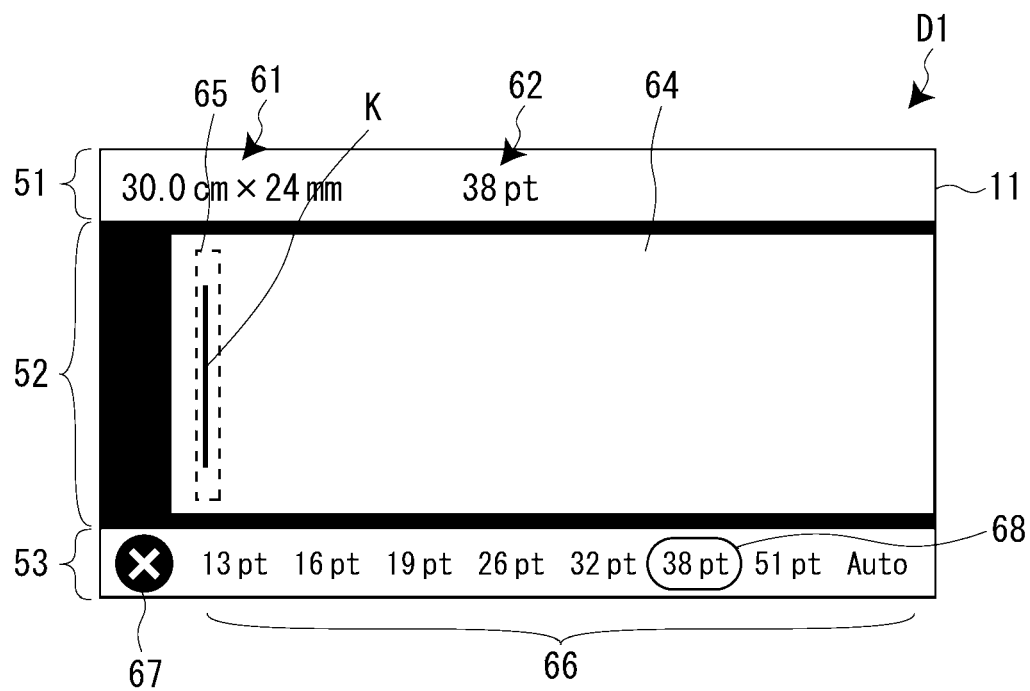
FIG. 18 illustrates another example of the edit screen.
Figure 19:
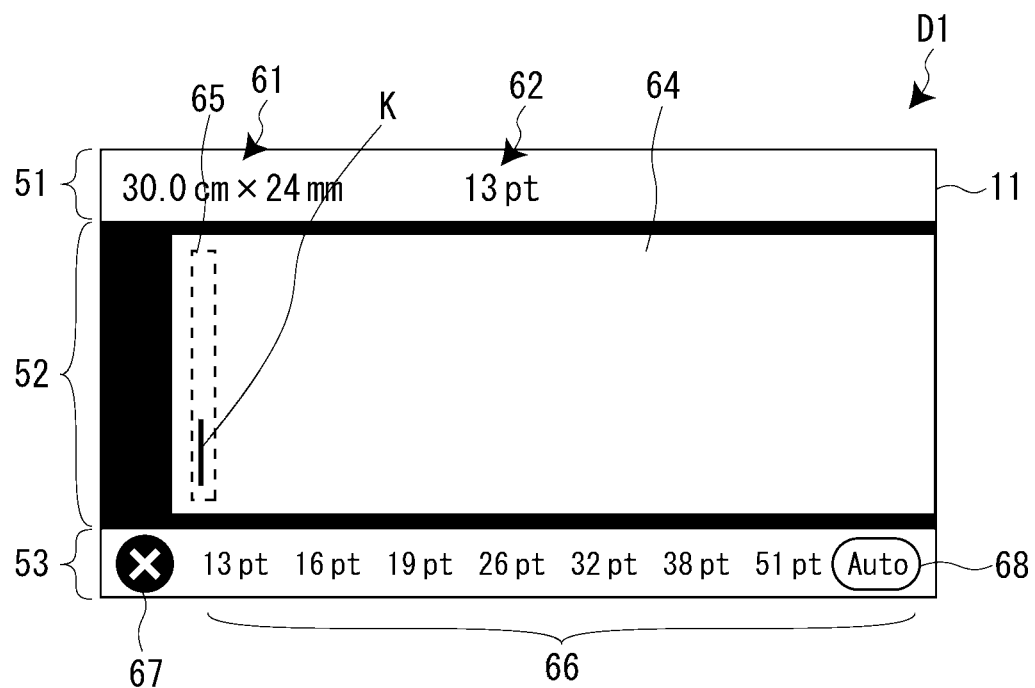
FIG. 19 illustrates an example of the edit screen when the line feed operation is performed in the state of FIG. 18.

FIG. 18 illustrates the edit screen D1 on which no letter string has been entered on the first line with its letter size set to "38 pt", and the cursor K is placed at the head of the letter string on the first line. FIG. 19 illustrates the edit screen D1 after the line feed operation has been performed in the state of FIG. 18. As illustrated in FIG. 19, the portable terminal 1 automatically sets the letter size of the second line after the line feed operation. In this case, the portable terminal 1 automatically sets the letter size of the second line after the line feed operation to the "13 pt", as indicated by the letter size information 62. In addition, the portable terminal 1 sets the letter size of the first line after the line feed operation to "38 pt", which is equal to the letter size of the first line which has been set before the line feed operation, although this is not illustrated in FIG. 19. Thus, when the cursor K moves to the first line in the state of FIG. 19, the portable terminal 1 displays the selection box 68 around "38 pt" within the third area 53 to indicate the letter size is set to "38 pt". The letter-size setting process performed when the state of FIG. 18 is changed to the state of FIG. 19 in response to the line feed operation corresponds to Step S06 in FIG. 5.

Figure 20:
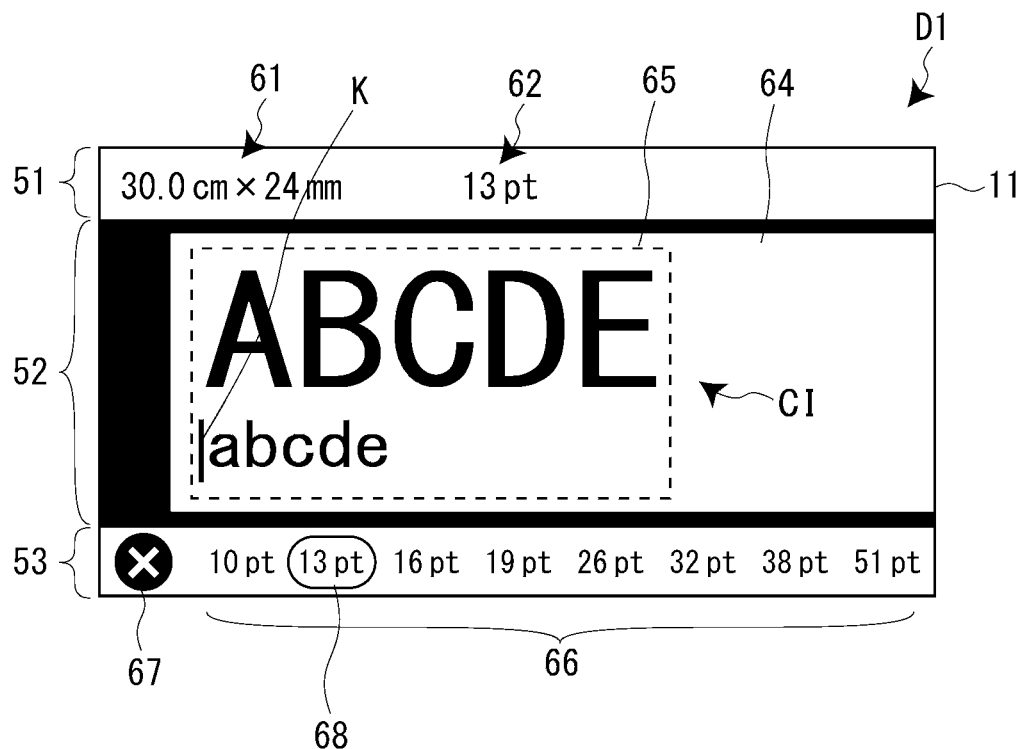
FIG. 20 illustrates another example of the edit screen.

Next, with reference to FIGS. 20 to 27, a description will be given below of the edit screen D1 when a line deletion operation is performed. FIG. 20 illustrates the edit screen D1 on which a letter string has been entered over two lines. The letter size of the first line is set to "38 pt", whereas the letter size of the second line is set to "13 pt". On the edit screen D1 of FIG. 20, the cursor K is placed on the left of the letter string on the second line.

Figure 21:
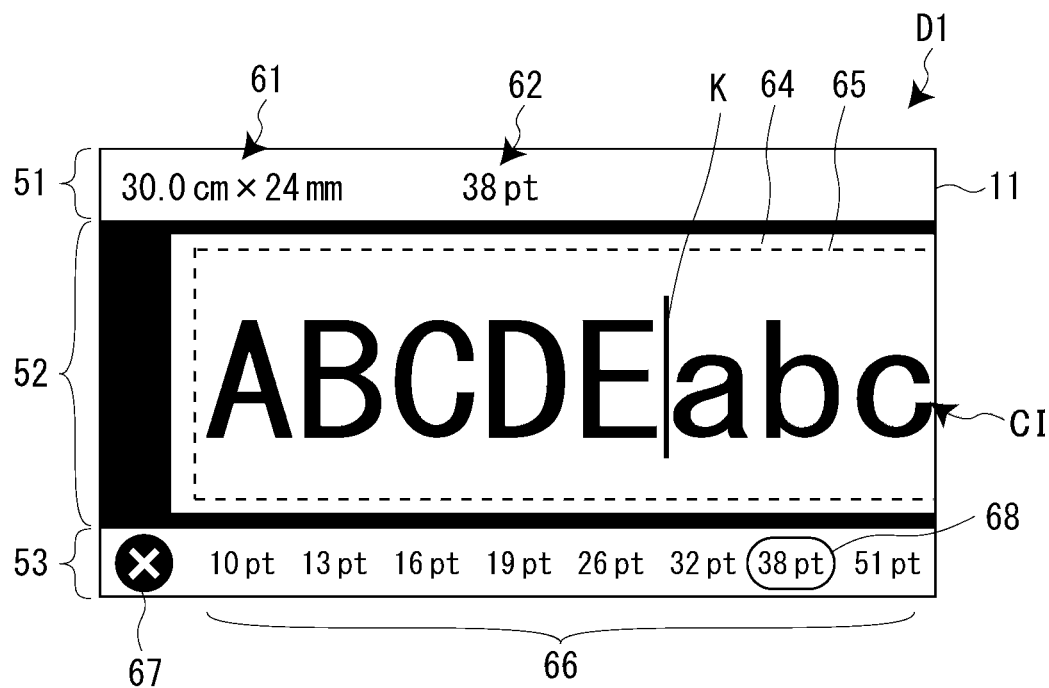
FIG. 21 illustrates an example of the edit screen when a line deletion operation is performed in the state of FIG. 20.

FIG. 21 illustrates the edit screen D1 after the line deletion operation has been performed in the state of FIG. 20. As illustrated in FIG. 21, the portable terminal 1 moves the letter string on the second line before the line deletion operation to the end of the letter string on the first line. In addition, the portable terminal 1 sets the letter size of the first line after the line deletion operation to "38 pt", which is equal to the letter size of the first line which has been set before the line deletion operation. The letter-size setting process performed when the state of FIG. 20 is changed to the state of FIG. 21 in response to the line deletion operation corresponds to Step S15 in FIG. 6.

Figure 22:
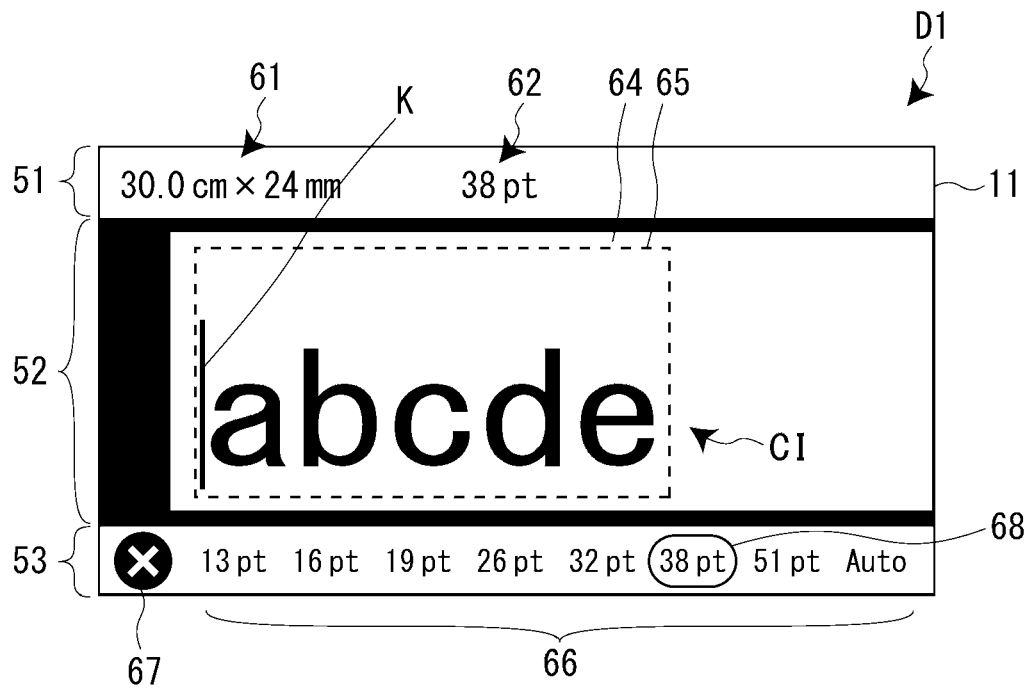
FIG. 22 illustrates another example of the edit screen.

FIG. 22 illustrates the edit screen D1 on which a letter string has been entered on the second line with its letter size set to "38 pt", and the cursor K is placed at the head of the letter string on the second line. On the edit screen D1 of FIG. 22, no letter string has been entered on the first line with its letter size set to "13 pt".

Figure 23:
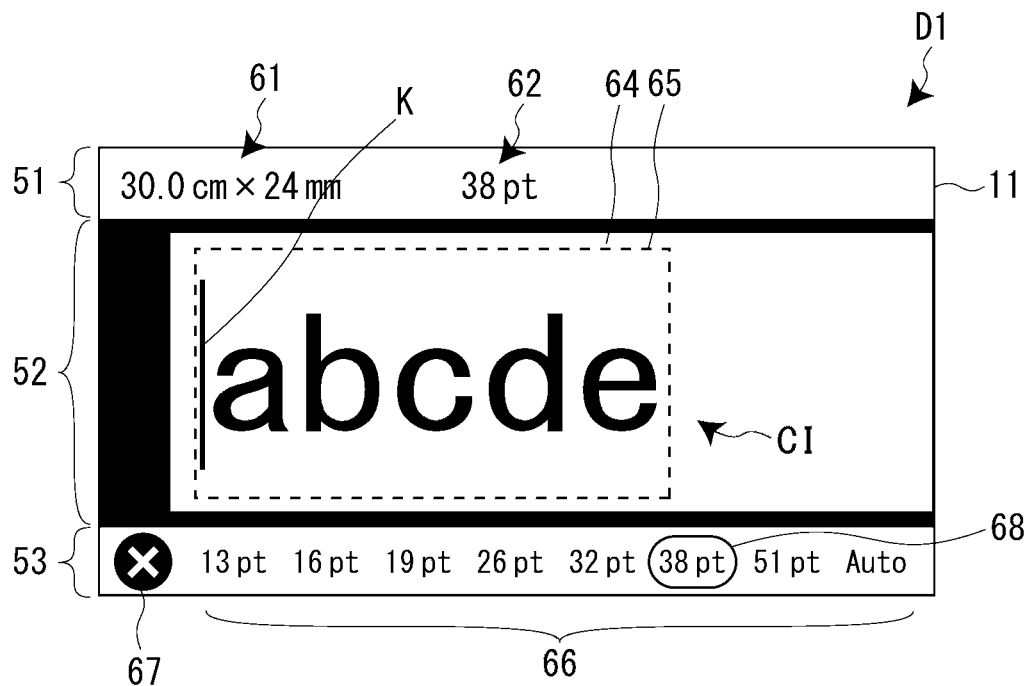
FIG. 23 illustrates an example of the edit screen when the line deletion operation is performed in the state of FIG. 22.

FIG. 23 illustrates the edit screen D1 after the line deletion operation has been performed in the state of FIG. 22. As illustrated in FIG. 23, the portable terminal 1 moves the letter string on the second line before the line deletion operation to the first line. In addition, the portable terminal 1 sets the letter size of the first line after the line deletion operation to "38 pt", which is equal to the letter size of the second line which has been set before the line deletion operation. The letter-size setting process performed when the state of FIG. 22 is changed to the state of FIG. 23 in response to the line deletion operation corresponds to Step S14 in FIG. 6.

Figure 24:
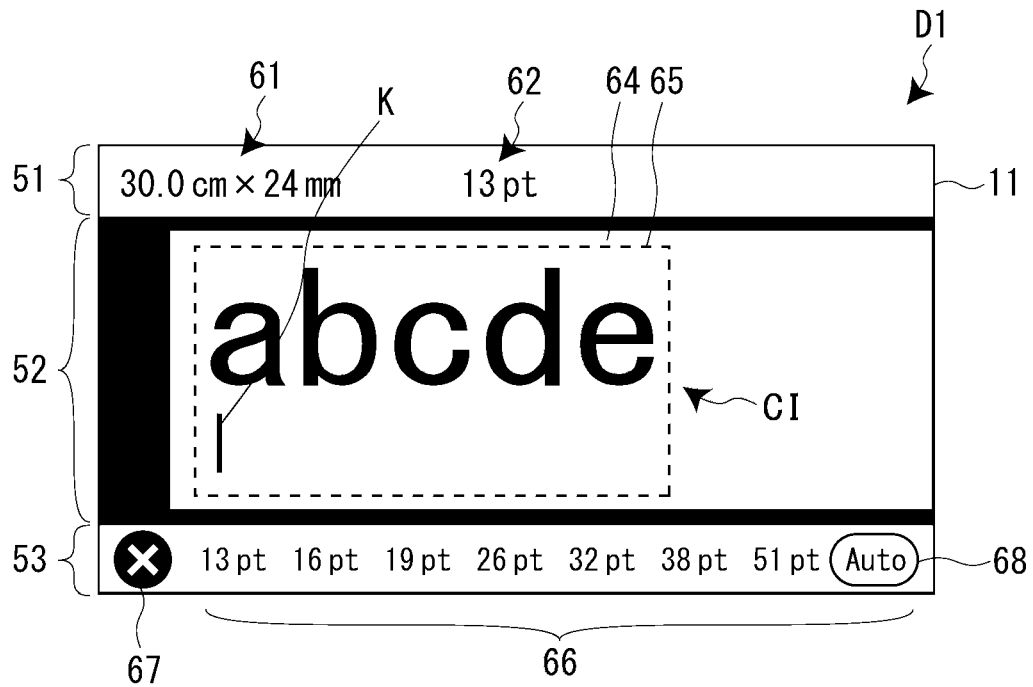
FIG. 24 illustrates another example of the edit screen.

FIG. 24 illustrates the edit screen D1 on which no letter string has been entered on the second line with its letter size is automatically set to "13 pt", and the cursor K is placed at the head of the letter string on the second line. On the edit screen D1 of FIG. 24, a letter string has been entered on the first line with its letter size set to "38 pt".

Figure 25:
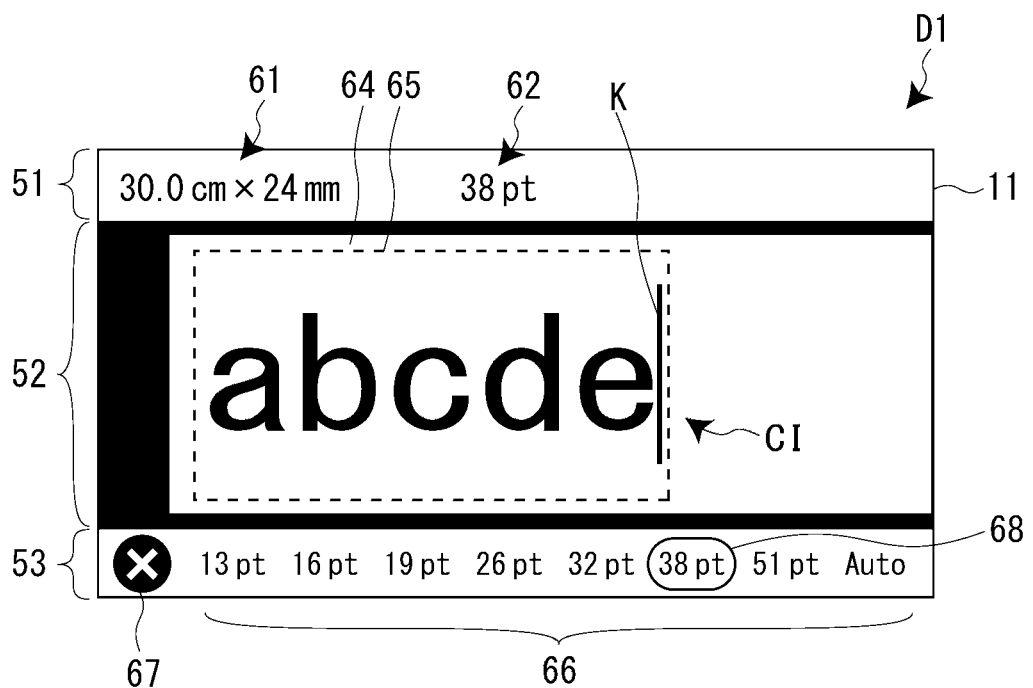
FIG. 25 illustrates an example of the edit screen when the line deletion operation is performed in the state of FIG. 24.

FIG. 25 illustrates the edit screen D1 after the line deletion operation has been performed in the state of FIG. 24. As illustrated in FIG. 25, the portable terminal 1 deletes the second line and then moves the cursor K that has been placed on the second line to the end of the first line. In this case, the portable terminal 1 sets the letter size of the first line after the line deletion operation to "38 pt", which is equal to the letter size of the first line which has been set before the line deletion operation. The letter-size setting process performed when the state of FIG. 24 is changed to the state of FIG. 25 in response to the line deletion operation corresponds to Step S15 in FIG. 6.

Figure 26:
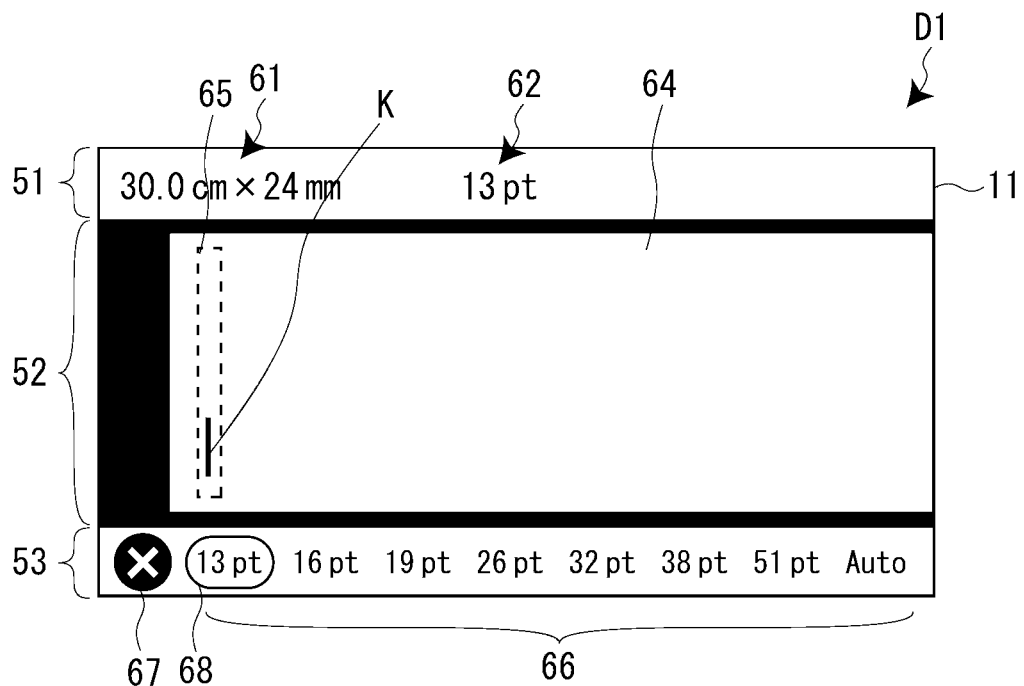
FIG. 26 illustrates another example of the edit screen.

FIG. 26 illustrates the edit screen D1 on which no letter string has been along the second line with its letter size automatically set to "13 pt", and the cursor K is placed at the head of the second line. On the edit screen D1 of FIG. 26, no letter string has been entered on the first line with its letter size set to "38 pt".

Figure 27:
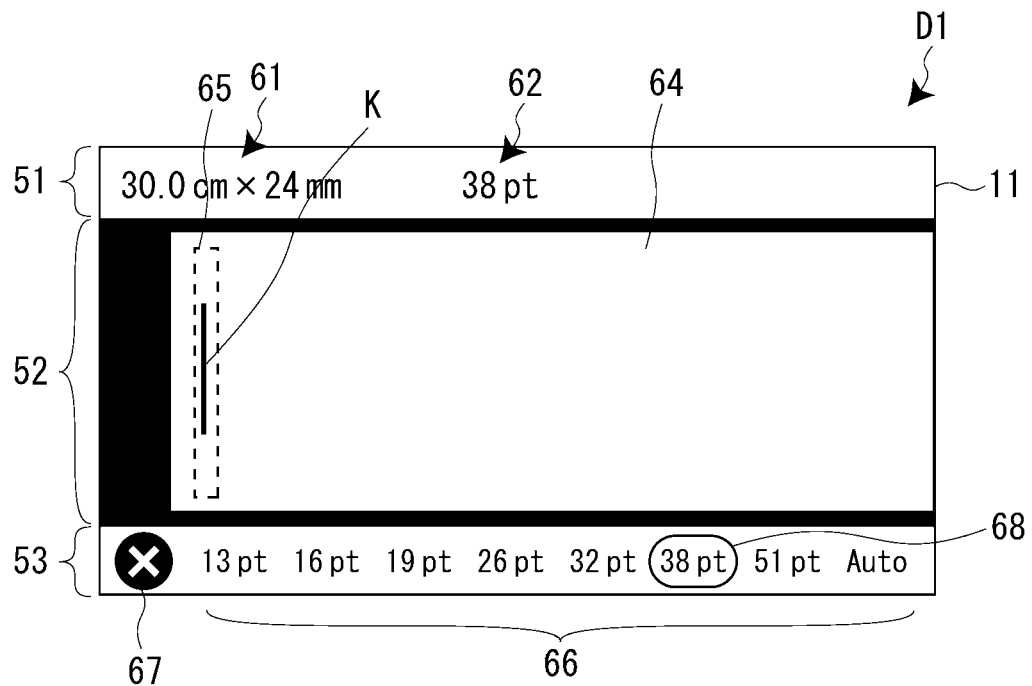
FIG. 27 illustrates an example of the edit screen when the line deletion operation is performed in the state of FIG. 26.

FIG. 27 illustrates the edit screen D1 after the line deletion operation has been performed in the state of FIG. 26. As illustrated in FIG. 27, the portable terminal 1 moves the cursor K to the first line and then sets the letter size of the first line after the line deletion operation to "38 pt", which is equal to the letter size of the first line which has been set before the line deletion operation. The letter-size setting process performed when the state of FIG. 26 is changed to the state of FIG. 27 in response to the line deletion operation corresponds to Step S15 in FIG. 6.

Figure 28:
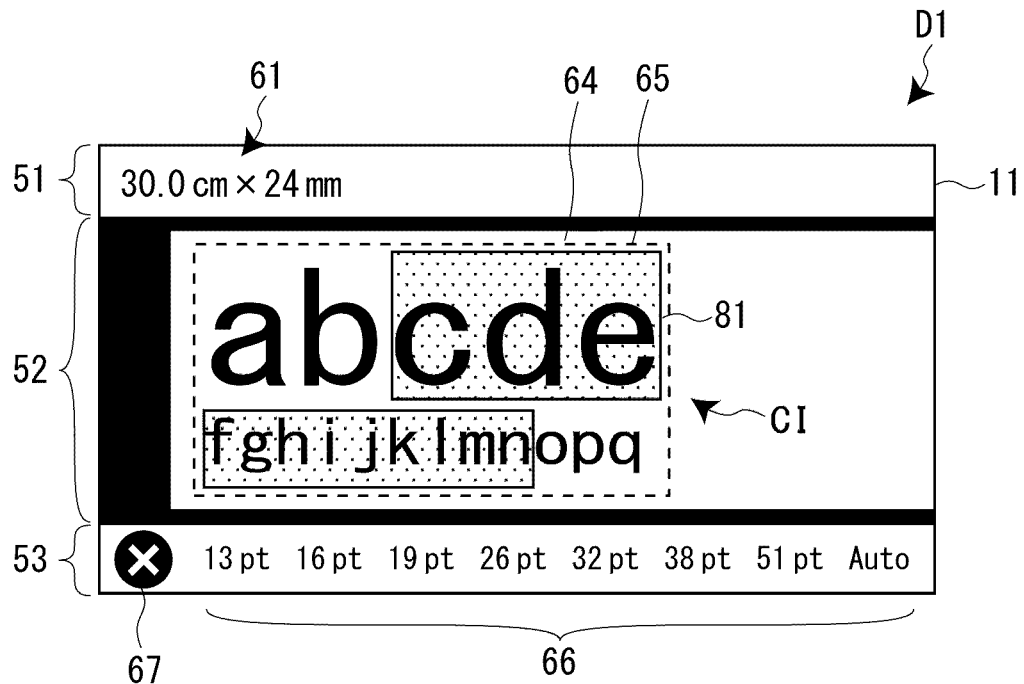
FIG. 28 illustrates another example of the edit screen.

Next, with reference to FIGS. 28 to 35, a description will be given below of the edit screen D1 when the range selection and deletion operation is performed on a plurality of lines. On the edit screen D1 in FIG. 28, a letter string is entered over two lines. The letter size of the first line is set to "38 pt", whereas the letter size of the second line is set to "13 pt". In addition, on the edit screen D1 in FIG. 28, the selection range 81 spans between the middles of the first and second lines. In the example of FIG. 28, the shaded area corresponds to the selection range 81. When the selection range 81 contains a plurality of lines with different letter sizes as illustrated in FIG. 28, the portable terminal 1 hides the letter size information 62 from the first area 51 and the selection box 68 from the third area 53 (see FIG. 8 and others). This also applies to FIGS. 30, 32, and 34.

Figure 29:
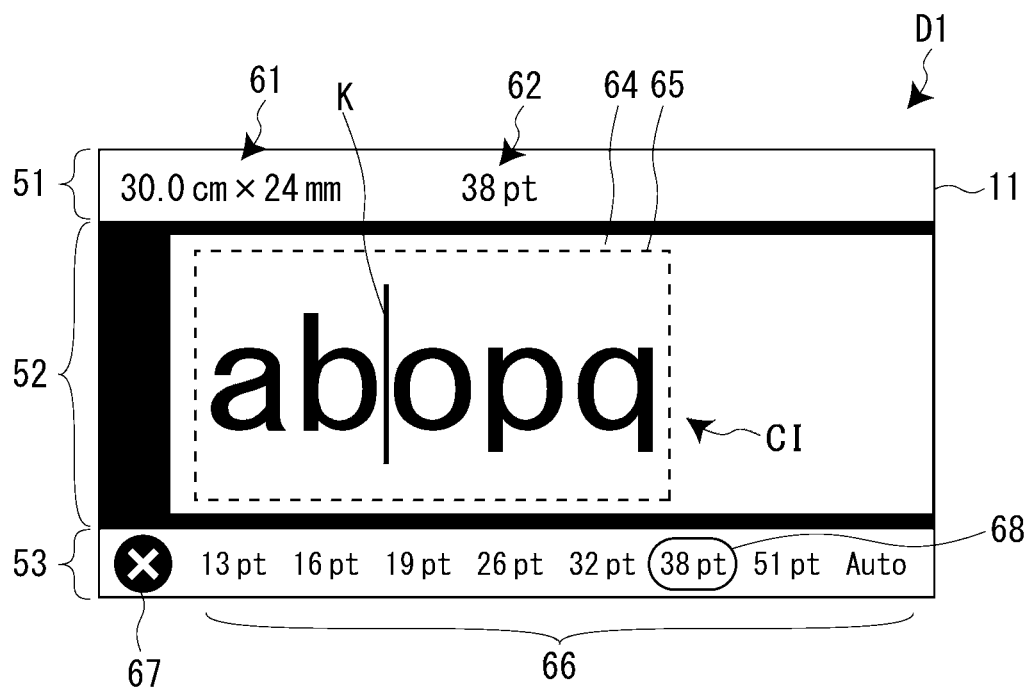
FIG. 29 illustrates an example of the edit screen when a range selection and deletion operation is performed on a plurality of lines in the state of FIG. 28.

FIG. 29 illustrates the edit screen D1 after the range selection and deletion operation has been performed on a plurality of lines in the state of FIG. 28. As illustrated in FIG. 29, the portable terminal 1 deletes the letters within the selection range 81 and then sets the letter size of the first line after the range selection and deletion operation to "38 pt", which is equal to the letter size of the first line which has been set before the range selection and deletion operation. The letter-size setting process performed when the state of FIG. 28 is changed to the state of FIG. 29 in response to the range selection and deletion operation on the plurality of lines corresponds to Step S25 in FIG. 7.

Figure 30:
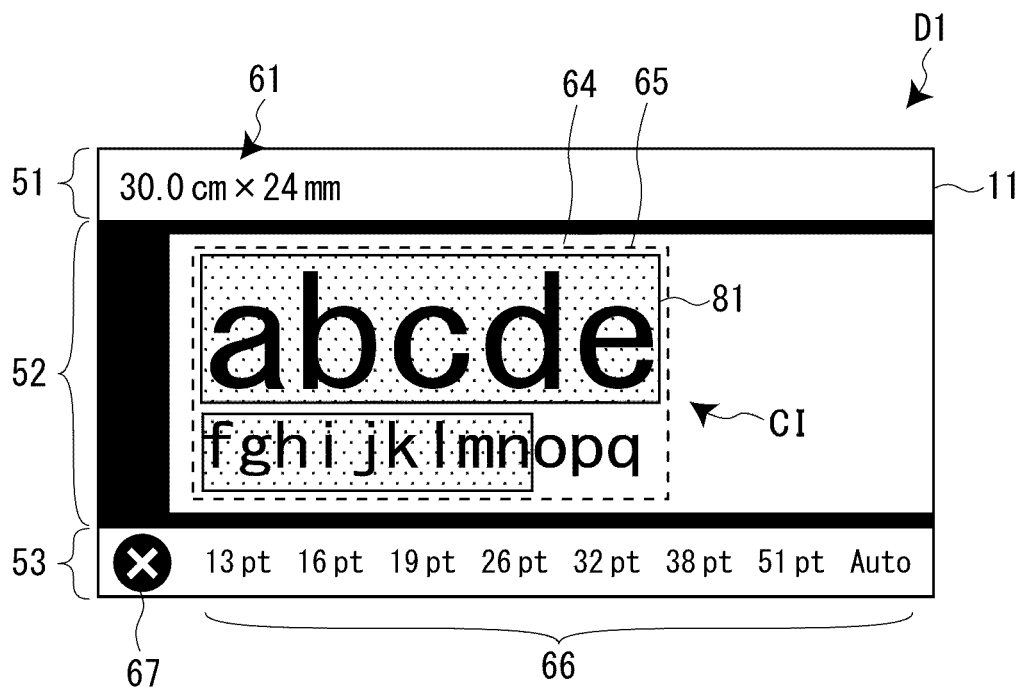
FIG. 30 illustrates another example of the edit screen.

On the edit screen D1 in FIG. 30, a letter string is entered over two lines. The letter size of the first line is set to "38 pt", whereas the letter size of the second line is set to "13 pt". In addition, on the edit screen D1 in FIG. 30, the selection range 81 spans between the head of the first line and the middle of the second line.

Figure 31:
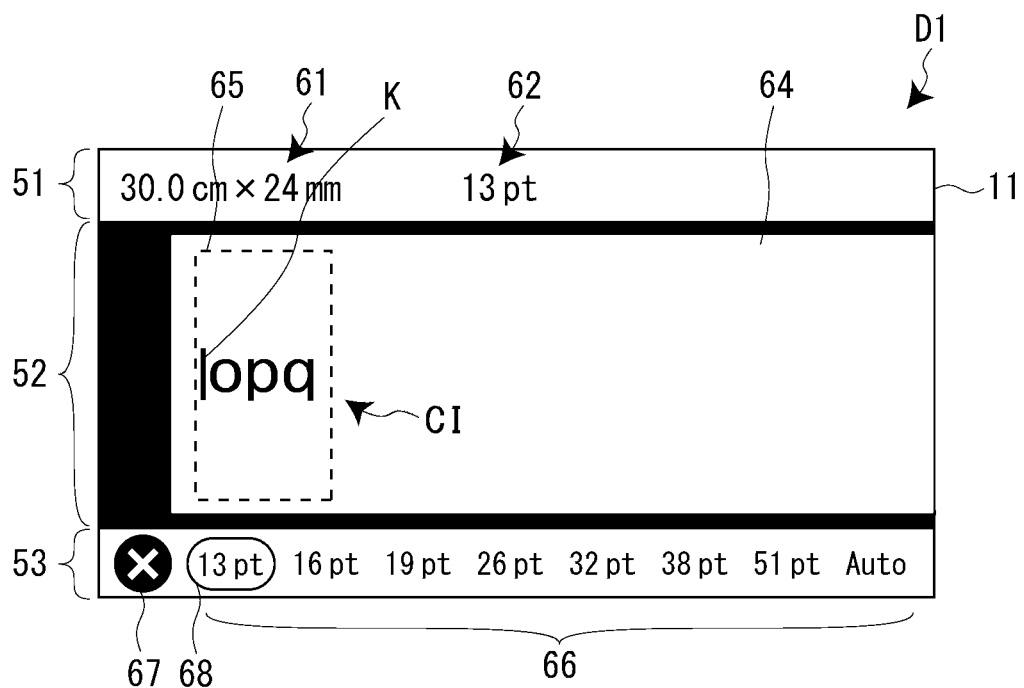
FIG. 31 illustrates an example of the edit screen when the range selection and deletion operation is performed on a plurality of lines in the state of FIG. 30.

FIG. 31 illustrates the edit screen D1 after the range selection and deletion operation has been performed on a plurality of lines in the state of FIG. 30. As illustrated in FIG. 31, the portable terminal 1 deletes the letters within the selection range 81 and then sets the letter size of the first line after the range selection and deletion operation to "13 pt", which is equal to the letter size of the second line which has been set before the range selection and deletion operation. The letter-size setting process performed when the state of FIG. 30 transmits to the state of FIG. 31 in response to the range selection and deletion operation on the plurality of lines corresponds to Step S24 in FIG. 7.

Figure 32:
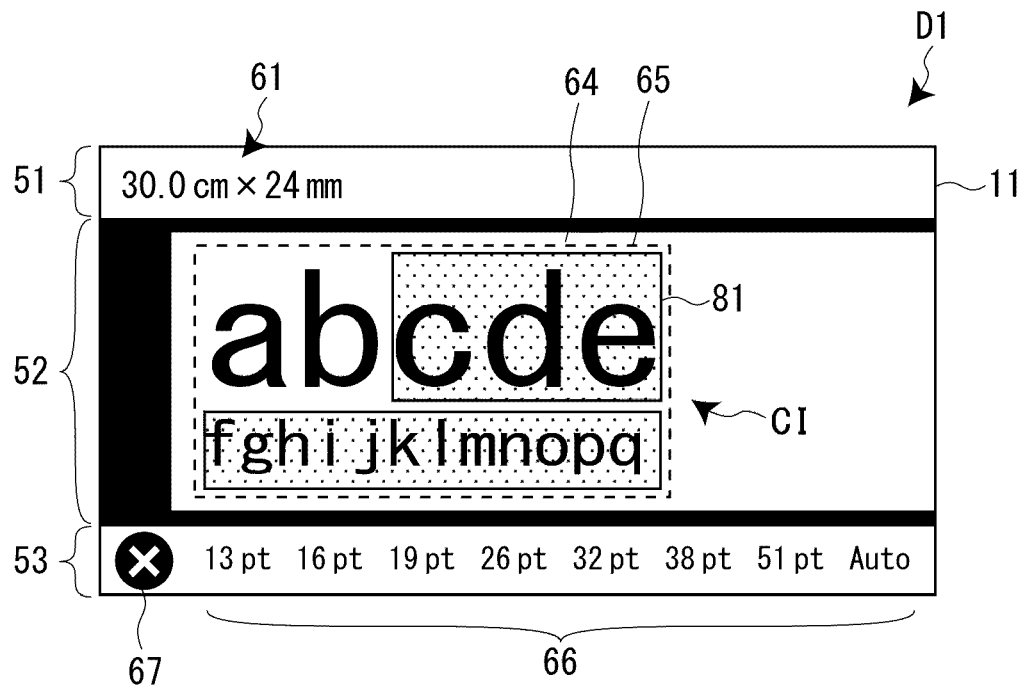
FIG. 32 illustrates another example of the edit screen.

On the edit screen D1 in FIG. 32, a letter string is entered over two lines. The letter size of the first line is set to "38 pt", whereas the letter size of the second line is set to "13 pt". In addition, on the edit screen D1 in FIG. 32, the selection range 81 spans between the middle of the first line and the end of the second line.

Figure 33:
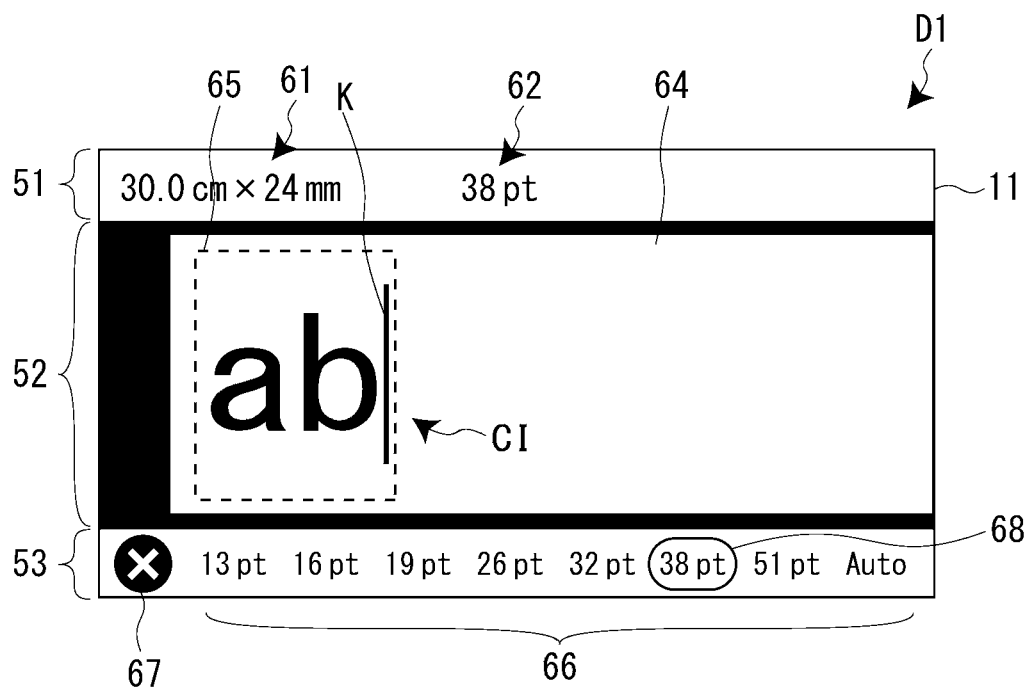
FIG. 33 illustrates an example of the edit screen when the range selection and deletion operation is performed on a plurality of lines in the state of FIG. 32.

FIG. 33 illustrates the edit screen D1 after the range selection and deletion operation has been performed on a plurality of lines in the state of FIG. 32. As illustrated in FIG. 33, the portable terminal 1 deletes the letters within the selection range 81 and then sets the letter size of the first line after the range selection and deletion operation to "38 pt", which is equal to the letter size of the first line which has been set before the range selection and deletion operation. The letter-size setting process performed when the state of FIG. 32 is changed to the state of FIG. 33 in response to the range selection and deletion operation on the plurality of lines corresponds to Step S25 in FIG. 7.

Figure 34:
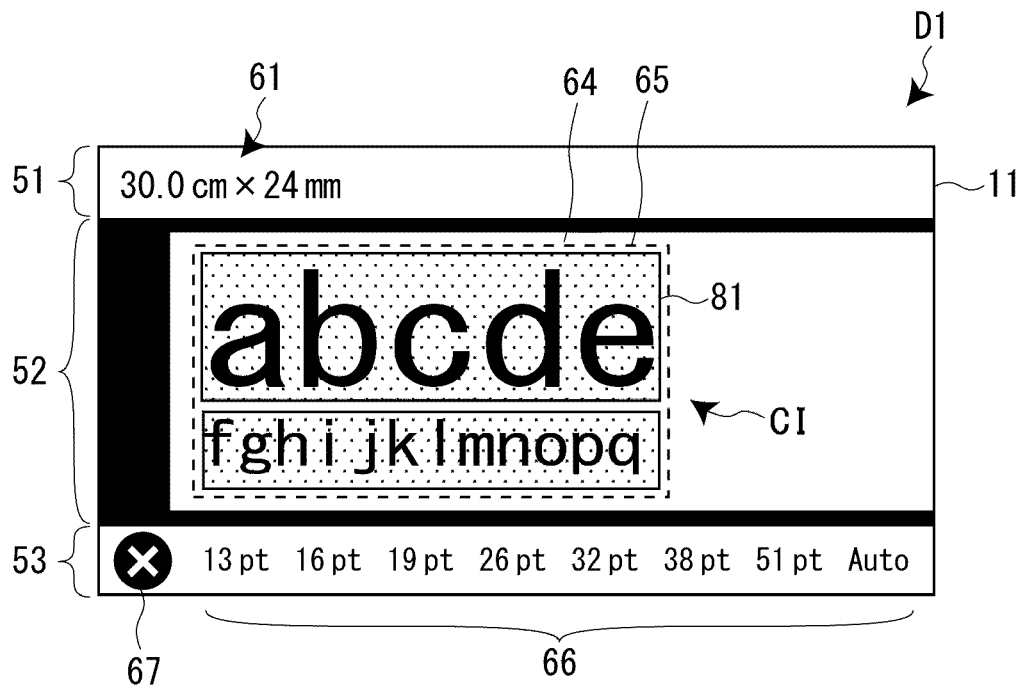
FIG. 34 illustrates another example of the edit screen.

On the edit screen D1 in FIG. 34, a letter string is entered over two lines. The letter size of the first line is set to "38 pt", whereas the letter size of the second line is set to "13 pt". In addition, on the edit screen D1 in FIG. 34, the selection range 81 spans between the head of the first line and the end of the second line.

Figure 35:
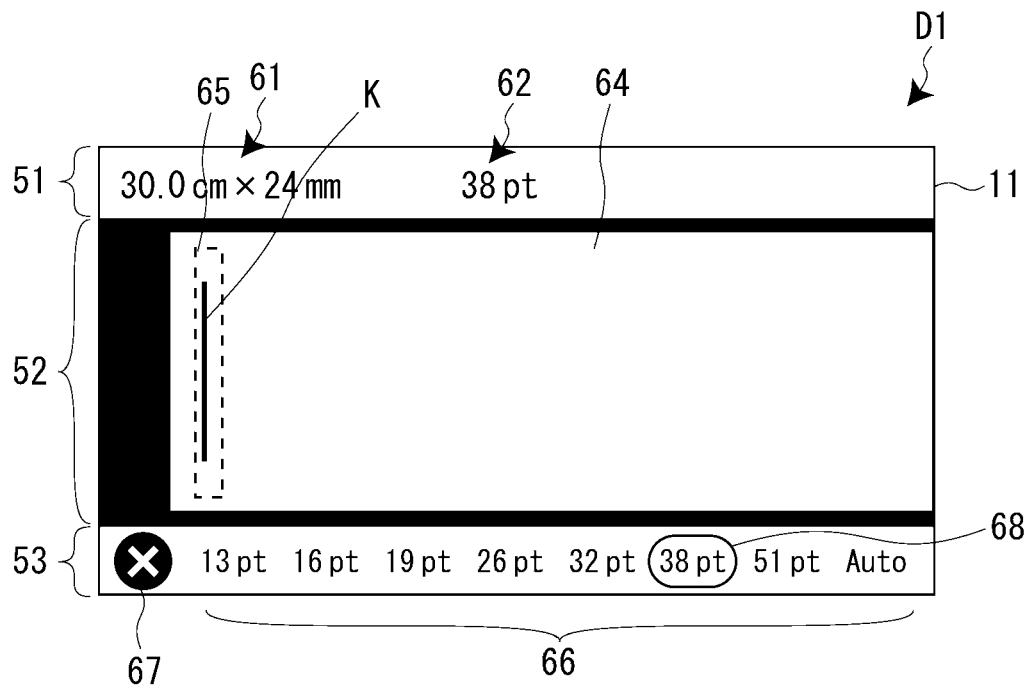
FIG. 35 illustrates an example of the edit screen when the range selection and deletion operation is performed on a plurality of lines in the state of FIG. 34.

FIG. 35 illustrates the edit screen D1 after the range selection and deletion operation has been performed on a plurality of lines in the state of FIG. 34. As illustrated in FIG. 35, the portable terminal 1 deletes the entire letter string over the first and second lines within the selection range 81 and then sets the letter size of the first line after the range selection and deletion operation to "38 pt", which is equal to the letter size of the first line which has been set before the range selection and deletion operation. The letter-size setting process performed when the state of FIG. 34 is changed to the state of FIG. 35 in response to the range selection and deletion operation on the plurality of lines corresponds to Step S25 in FIG. 7.

As described above, a portable terminal 1 according to this embodiment, when a line feed operation is performed at a head or an end of an n-th line through an edit screen D1, automatically sets a letter size of at least one of the n-th line and an (n+1)-th line. As a result, the portable terminal 1 can suppress the length, in +Y direction, of a letter string over a plurality of lines which has been entered through the edit screen D1 from exceeding the length of a printable area PE in the +Y direction, as opposed to a case where a letter size of the n-th and (n+1)-th lines is set to the letter size of the n-th line which has been set before the line feed operation. In this way, the portable terminal 1 does not have to display an error display screen D2 so frequently that it is possible to provide good operability to a user.

When a line feed operation is performed in a middle of the n-th line, the portable terminal 1 may set the letter size of the n-th line and (n+1)-th line after the line feed operation to the letter size of the n-th line which was set before the line feed operation. When the line feed operation is performed at the head of the n-th line on which a letter is entered, the portable terminal 1 may set the letter size of the (n+1)-th line after the line feed operation to the letter size of the n-th line which was set before the line feed operation. When the line feed operation is performed at an end of the n-th line, the portable terminal 1 may set the letter size of the n-th line to the letter size of the n-th line which was set before the line feed operation. In this way, even when a line feed operation is performed, the portable terminal 1 does not have to always automatically set the letter size of both the n-th line and (n+1)-th line and, depending on the situation, may maintain the letter size of the n-th line and (n+1)-th line which was set before the line feed operation. Consequently, it is possible to suppress the user from feeling there is something strange about the screen image.

When a line deletion operation is performed, the portable terminal 1 may determine whether a letter is entered on a line previous to a line on which a cursor K is placed and may further determine whether the line deletion operation is performed at a head of a line on which a letter is entered. Then, depending on the determination result, the portable terminal 1 may set the letter size of the n-th line on which the cursor K is placed after the line deletion operation. In this way, the portable terminal 1 sets the letter size of the n-th line on which the cursor K is placed after the line deletion operation to one of the letter sizes of the n-th line and (n+1)-th line, depending on the situation upon the line deletion operation. Consequently, it is possible to suppress the user from feeling there is something strange about the screen image.

When a range selection and deletion operation is performed on a plurality of lines, the portable terminal 1 may determine whether a letter is present on a right of the cursor K after deletion of letters within the selection range 81 and may further determine whether a letter is present on a left of the cursor K after the deletion of the letters within the selection range 81. Then, depending on the determination result, the portable terminal 1 may set the letter size of the line on which the cursor K is placed after the deletion. In this way, the portable terminal 1 sets the letter size of the n-th line on which the cursor K is placed after the deletion to one of letter sizes of a first line within the selection range 81 and a last line within the selection range 81, depending on the situation upon the range selection and deletion operation on the plurality of lines. Consequently, it is possible to suppress the user from feeling there is something strange about the screen image.

It should be noted that the foregoing embodiment is not intended to limit the present disclosure and may be modified in the following ways.

Modification 1

In the foregoing embodiment, a portable terminal 1 prints a letter string over a plurality of lines arranged in a line direction, which is aligned with a width direction of a tape T, or the +Y direction. However, the portable terminal 1 may print a letter string over a plurality of lines arranged in a line direction, which is aligned with a length direction of the tape T, or the +X direction. In the case where the length of a printable area PE in the +X direction is fixed because the portable terminal 1 operates in the fixed-length printing mode, for example, the portable terminal 1 may set the letter size of a letter string on a line to a designated size when the letter size of this line is designated by a user. Then, the portable terminal 1 may automatically set the letter size of a letter string on the other lines so that the letter string maximally expands in the +X direction across the area defined by subtracting the area occupied by the designated line from the printable area PE.

Modification 2

The portable terminal 1 may perform the letter-size setting process in FIG. 5 only if some conditions as described below are not satisfied. One example of those conditions is that "when a line feed operation is performed on an n-th line with a designated letter size and, in response, a portable terminal 1 sets the letter size of the n-th line and (n+1)-th line after the line feed operation to the letter size of the n-th line which has been set before the line feed operation so that the total length, in the line direction, of the letter string over a plurality of lines which has been entered through an edit screen D1 is equal to or shorter than the length of a printable area PE in the line direction". The portable terminal 1 may perform a process of determining whether this condition is satisfied, instead of the process at Step S01 in FIG. 5. When determining that this condition is not satisfied, the portable terminal 1 may perform the process starting with Step S02. When determining that this condition is satisfied, the portable terminal 1 may set the letter size of the n-th line and (n+1)-th line after the line feed operation to the letter size of the n-th line which has been set before the line feed operation. With this configuration, when a line feed operation is performed, the portable terminal 1 does not have to display an error display screen D2 frequently and, nevertheless, can suppress the user from feeling there is something strange about the screen image.

Modification 3

When a line feed operation is performed at a head or an end of an n-th line, a portable terminal 1 may automatically set the letter sizes of the n-th line and (n+1)-th line after the line feed operation. Moreover, when receiving a line feed operation at the head of an n-th line, the portable terminal 1 may automatically set the letter size of the n-th line and may set the letter size of the (n+1)-th line after the line feed operation to the letter size of the n-th line which has been set before the line feed operation, regardless of whether a letter has been entered on the n-th line.

Modification 4

A tape printing apparatus 2 may include a detector that detects a projection or a recess formed in a tape cartridge C, instead of a cartridge information acquisition section 42. With this configuration, the tape printing apparatus 2 may acquire cartridge information from the detection result of the detector. Alternatively, the tape printing apparatus 2 may acquire the cartridge information from a circuit board with a memory element which is mounted on the case of the tape cartridge C.

Modification 5

Figure 4:
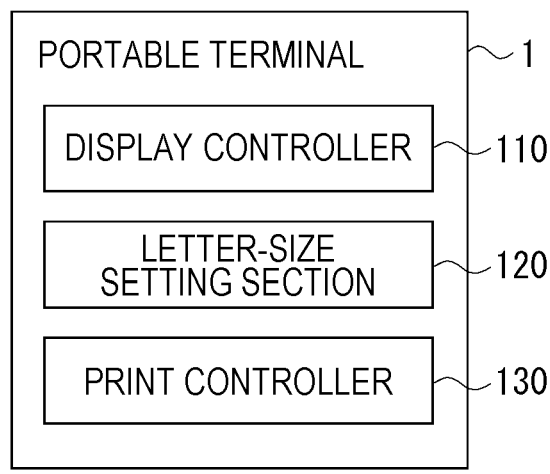
FIG. 4 is a block diagram of a functional configuration of the portable terminal.

The functional configuration of the portable terminal 1 as illustrated in FIG. 4 may be implemented by a tape printing apparatus 2. In this case, the three components constituting the functional configuration as illustrated in FIG. 4 may be implemented by a printing-apparatus-side CPU 44a executing various control programs stored in a printing-apparatus-side ROM 44b. Furthermore, the tape printing apparatus 2 may print a printed image G, based on an editing result with a keyboard 21. In the tape printing apparatus 2, a display controller 110 may cause a display 22 to display an edit screen D1 and an error display screen D2. In the tape printing apparatus 2, a print controller 130 may cause a printing section 43 to print a letter string over a plurality of lines entered through the edit screen D1 in a letter size set by a letter-size setting section 120.

Other Modifications

In the foregoing embodiment, a tape printing apparatus 2 employs a thermal ink transfer system to print an image on a tape T; however, the tape printing apparatus 2 may employ an ink jet or other printing system. In the foregoing embodiment, the tape printing apparatus 2 creates labels L by cutting a long tape T; however, the tape printing apparatus 2 may create labels L by printing images on respective short label members bonded onto a long tape T. In this case, a printable area PE depends on the size of each label member and a paragraph configuration. A tape printing apparatus 2 according to the foregoing embodiment may be applied to printers that print an image on a print medium, such as a copy paper sheet, other than a tape T and a label member. Moreover, other appropriate modifications are also possible without departing from the spirit of the present disclosure.

Supplementary Note

A description will be given below of supplementary notes of an information processing apparatus, a tape printing apparatus, a printing system, a method of controlling such an information processing apparatus, and a storage medium that stores a program for controlling such an information processing apparatus.

A portable terminal 1 includes: a display controller 110 that causes a touch panel 11 to display an edit screen D1 that allows for an edit of a letter string over a plurality of lines, the letter string to be printed within a printable area PE on a tape T by a tape printing apparatus 2; a letter-size setting section 120 that sets a letter size of the letter string over the plurality of lines, the letter string being entered through the edit screen D1; and a print controller 130 that causes the tape printing apparatus 2 to print the letter string over the plurality of lines entered through the edit screen D1 in the letter size set by the letter-size setting section 120. The letter-size setting section 120 is configured to differently set letter sizes of the letter string on the respective lines. When a line feed operation is performed at a head or an end of an n-th line through the edit screen D1, a letter size of the n-th line being preset in accordance with a user's designation, n being an integer equal to or more than one, the letter-size setting section automatically sets a letter size of at least one of the n-th line and an (n+1)-th line after the line feed operation so that a length, in a line direction, of the letter string over the plurality of lines entered through the edit screen D1 is equal to or shorter than a length of the printable area PE in the line direction, the line direction being orthogonal to an extending direction of the lines.

A tape printing apparatus 2 includes: a printing section 43 that prints an image on a tape T; a display controller 110 that causes a display 22 to display an edit screen D1 that allows for an edit of a letter string over a plurality of lines, the letter string to be printed within a printable area PE on the tape T by the printing section 43; a letter-size setting section 120 that sets a letter size of the letter string over the plurality of lines, the letter string being entered through the edit screen D1; and a print controller 130 that causes the printing section 43 to print the letter string over the plurality of lines entered through the edit screen D1 in the letter size set by the letter-size setting section 120. The letter-size setting section 120 is configured to differently set letter sizes of the letter string on the respective lines. When a line feed operation is performed at a head or an end of an n-th line through the edit screen D1, a letter size of the n-th line being preset in accordance with a user's designation, n being an integer equal to or more than one, the letter-size setting section automatically sets a letter size of at least one of the n-th line and an (n+1)-th line after the line feed operation so that a length, in a line direction, of the letter string over the plurality of lines entered through the edit screen D1 is equal to or shorter than a length of the printable area PE in the line direction, the line direction being orthogonal to an extending direction of the lines.

A printing system SY includes: a portable terminal 1; and a tape printing apparatus 2 that is connected to the portable terminal 1 and configured to communicate with the portable terminal 1. The portable terminal 1 includes: a display controller 110 that causes a touch panel 11 to display an edit screen D1 that allows for an edit of a letter string over a plurality of lines, the letter string to be printed within a printable area PE on a tape T by the tape printing apparatus 2; a letter-size setting section 120 that sets a letter size of the letter string over the plurality of lines, the letter string being entered through the edit screen D1; and a print controller 130 that causes the tape printing apparatus 2 to print the letter string over the plurality of lines entered through the edit screen D1 in the letter size set by the letter-size setting section 120. The letter-size setting section 120 is configured to differently set letter sizes of the letter string on the respective lines. When a line feed operation is performed at a head or an end of an n-th line through the edit screen D1, a letter size of the n-th line being preset in accordance with a user's designation, n being an integer equal to or more than one, the letter-size setting section automatically sets a letter size of at least one of the n-th line and an (n+1)-th line after the line feed operation so that a length, in a line direction, of the letter string over the plurality of lines entered through the edit screen D1 is equal to or shorter than a length of the printable area PE in the line direction, the line direction being orthogonal to an extending direction of the lines.

A method of controlling a portable terminal 1 includes: causing, by using the portable terminal 1, a touch panel 11 to display an edit screen D1 that allows for an edit of a letter string over a plurality of lines, the letter string to be printed within a printable area PE on a tape T by a tape printing apparatus 2; setting, by using the portable terminal 1, a letter size of the letter string over the plurality of lines, the letter string being entered through the edit screen D1; and causing, by using the portable terminal 1, the tape printing apparatus 2 to print the letter string over the plurality of lines entered through the edit screen D1 in the set letter size. In setting of the letter size of the letter string over the plurality of lines, letter sizes of the letter string are configured to be differently set on the respective lines and, when a line feed operation is performed at a head or an end of an n-th line through the edit screen D1, a letter size of the n-th line being preset in accordance with a user's designation, n being an integer equal to or more than one, a letter size of at least one of the n-th line and an (n+1)-th line after the line feed operation is set so that a length, in a line direction, of the letter string over the plurality of lines entered through the edit screen D1 is equal to or shorter than a length of the printable area PE in the line direction, the line direction being orthogonal to an extending direction of the lines.

A non-transitory computer-readable storage medium that stores a label creation application 30 that includes: causing, by using a portable terminal 1, a touch panel 11 to display an edit screen D1 that allows for an edit of a letter string over a plurality of lines, the letter string to be printed within a printable area PE on a tape T by a tape printing apparatus 2; setting, by using the portable terminal 1, a letter size of the letter string over the plurality of lines, the letter string being entered through the edit screen D1; and causing, by using the portable terminal 1, the tape printing apparatus 2 to print the letter string over the plurality of lines entered through the edit screen D1 with the set letter size. In setting of the letter size of the letter string over the plurality of lines, the portable terminal 1 is configured to differently set letter sizes of the letter string on the respective lines. When a line feed operation is performed at a head or an end of an n-th line through the edit screen D1, a letter size of the n-th line being preset in accordance with a user's designation, n being an integer equal to or more than one, the information processing apparatus sets a letter size of at least one of the n-th line and an (n+1)-th line after the line feed operation so that a length, in a line direction, of the letter string over the plurality of lines entered through the edit screen D1 is equal to or shorter than a length of the printable area PE in the line direction, the line direction being orthogonal to an extending direction of the lines.

According to the above configurations, a portable terminal 1 or a tape printing apparatus 2, when a line feed operation is performed at a head or an end of an n-th line through an edit screen D1, automatically sets a letter size of at least one of the n-th line and an (n+1)-th line. Therefore, the portable terminal 1 or the tape printing apparatus 2 can suppress a length, in a line direction, of a letter string over a plurality of lines which has been entered through the edit screen D1 from exceeding a length of a printable area PE in the line direction, as opposed to a case where a letter size of the n-th and (n+1)-th lines is set to the letter size of the n-th line which has been set before the line feed operation. In this way, the portable terminal 1 or the tape printing apparatus 2 does not have to display an error display screen D2 so frequently that it is possible to provide good operability to a user.

In the above portable terminal 1, when a line feed operation is performed in a middle of the n-th line through the edit screen D1, a letter-size setting section 120 may set a letter size of the n-th line and the (n+1)-th line after the line feed operation to a letter size of the n-th line which was set before the line feed operation.

In the above tape printing apparatus 2, when a line feed operation is performed in a middle of the n-th line through the edit screen D1, a letter-size setting section 120 may set a letter size of the n-th line and the (n+1)-th line after the line feed operation to a letter size of the n-th line which was set before the line feed operation.

In the above printing system SY, when a line feed operation is performed in a middle of the n-th line through the edit screen D1, a letter-size setting section 120 may set a letter size of the n-th line and the (n+1)-th line after the line feed operation to a letter size of the n-th line which was set before the line feed operation.

According to the above method of controlling a portable terminal 1, in setting of the letter size of the letter string over the plurality of lines, when a line feed operation is performed in a middle of the n-th line through the edit screen D1, a letter size of the n-th line and the (n+1)-th line after the line feed operation may be set to a letter size of the n-th line which was set before the line feed operation.

According to the above label creation application 30, in setting of the letter size of the letter string over the plurality of lines, when a line feed operation is performed in a middle of the n-th line through the edit screen D1, a letter size of the n-th line and the (n+1)-th line after the line feed operation may be set to a letter size of the n-th line which was set before the line feed operation.

According to the above configurations, when a line feed operation is performed in a middle of an n-th line, a portable terminal 1 may set a letter size of the n-th line and an (n+1)-th line after the line feed operation to a letter size of the n-th line which was set before the line feed operation. Consequently, it is possible to suppress the user from feeling there is something strange about the screen image.

In the above portable terminal 1, when the line feed operation is performed at the head of the n-th line on which a letter is entered through the edit screen D1, the letter-size setting section 120 may automatically set a letter size of the n-th line after the line feed operation and may set a letter size of the (n+1)-th line after the line feed operation to a letter size of the n-th line which was set before the line feed operation.

According to the above configurations, when the line feed operation is performed at the head of the n-th line on which a letter is entered through the edit screen D1, the portable terminal 1 may set a letter size of the (n+1)-th line after the line feed operation to a letter size of the n-th line which has been set before the line feed operation. Consequently, it is possible to suppress the user from feeling there is something strange about the screen image.

In the above portable terminal 1, when the line feed operation is performed at the end of the n-th line through the edit screen D1, the letter-size setting section 120 may set a letter size of the n-th line after the line feed operation to a letter size of the n-th line which was set before the line feed operation and may automatically set a letter size of the (n+1)-th line after the line feed operation.

According to the above configuration, when the line feed operation is performed at the end of the n-th line through the edit screen D1, the portable terminal 1 maintains a letter size of an n-th line that has been set before the line feed operation. Consequently, it is possible to suppress the user from feeling there is something strange about the screen image.

What is claimed is:

1. An information processing apparatus comprising:

a display controller that causes a display section to display an edit screen that allows for an edit of a letter string over a plurality of lines, the letter string to be printed within a printable area on a print medium by a tape printing apparatus;
a letter-size setting section that sets a letter size of the letter string over the plurality of lines, the letter string being entered through the edit screen; and
a print controller that causes the tape printing apparatus to print the letter string over the plurality of lines entered through the edit screen in the letter size set by the letter-size setting section, wherein
the letter-size setting section is configured to differently set letter sizes of the letter string on the respective lines, and
when a line feed operation is performed at a head or an end of an n-th line through the edit screen, a letter size of the n-th line being preset in accordance with a user's designation, n being an integer equal to or more than one, the letter-size setting section automatically sets a letter size of at least one of the n-th line and an (n+1)-th line after the line feed operation so that a length, in a line direction, of the letter string over the plurality of lines entered through the edit screen is equal to or shorter than a length of the printable area in the line direction, the line direction being orthogonal to an extending direction of the lines.

2. The information processing apparatus according to claim 1, wherein
when a line feed operation is performed in a middle of the n-th line through the edit screen, the letter-size setting section sets a letter size of the letter string of the n-th line and the (n+1)-th line after the line feed operation to a letter size of the n-th line which was set before the line feed operation.

3. The information processing apparatus according to claim 1, wherein
when the line feed operation is performed at the head of the n-th line on which a letter is entered through the edit screen, the letter-size setting section automatically sets a letter size of the n-th line after the line feed operation and sets a letter size of the (n+1)-th line after the line feed operation to a letter size of the n-th line which was set before the line feed operation.

4. The information processing apparatus according to claim 1, wherein
when the line feed operation is performed at the end of the n-th line through the edit screen, the letter-size setting section sets a letter size of the n-th line after the line feed operation to a letter size of the n-th line which was set before the line feed operation and automatically sets a letter size of the (n+1)-th line after the line feed operation.

5. A tape printing apparatus comprising:
a printing section that prints an image on a print medium;
a display controller that causes a display section to display an edit screen that allows for an edit of a letter string over a plurality of lines, the letter string to be printed within a printable area on the print medium by the printing section;
a letter-size setting section that sets a letter size of the letter string over the plurality of lines, the letter string being entered through the edit screen; and
a print controller that causes the printing section to print the letter string over the plurality of lines entered through the edit screen in the letter size set by the letter-size setting section, wherein the letter-size setting section is configured to differently set letter sizes of the letter string on the respective lines, and when a line feed operation is performed at a head or an end of an n-th line through the edit screen, a letter size of the n-th line being preset in accordance with a user's designation, n being an integer equal to or more than one, the letter-size setting section automatically sets a letter size of at least one of the n-th line and an (n+1)-th line after the line feed operation so that a length, in a line direction, of the letter string over the plurality of lines entered through the edit screen is equal to or shorter than a length of the printable area in the line direction, the line direction being orthogonal to an extending direction of the lines.

6. The tape printing apparatus according to claim 5, wherein
when a line feed operation is performed in a middle of the n-th line through the edit screen, the letter-size setting section sets a letter size of the n-th line and the (n+1)-th line after the line feed operation to a letter size of the n-th line which was set before the line feed operation.

7. A printing system comprising:
an information processing apparatus; and
a tape printing apparatus connected to the information processing apparatus, the tape printing apparatus configured to communicate with the information processing apparatus,
the information processing apparatus including
a display controller that causes a display section to display an edit screen that allows for an edit of a letter string over a plurality of lines, the letter string to be printed within a printable area on a print medium by the tape printing apparatus,
a letter-size setting section that sets a letter size of the letter string over the plurality of lines, the letter string being entered through the edit screen, and
a print controller that causes the tape printing apparatus to print the letter string over the plurality of lines entered through the edit screen in the letter size set by the letter-size setting section, wherein
the letter-size setting section is configured to differently set letter sizes of the letter string on the respective lines, and
when a line feed operation is performed at a head or an end of an n-th line through the edit screen, a letter size of the n-th line being preset in accordance with a user's designation, n being an integer equal to or more than one, the letter-size setting section automatically sets a letter size of at least one of the n-th line and an (n+1)-th line after the line feed operation so that a length, in a line direction, of the letter string over the plurality of lines entered through the edit screen is equal to or shorter than a length of the printable area in the line direction, the line direction being orthogonal to an extending direction of the lines.

8. The printing system according to claim 7, wherein
when a line feed operation is performed in a middle of the n-th line through the edit screen, the letter-size setting section sets a letter size of the n-th line and the (n+1)-th line after the line feed operation to a letter size of the n-th line which was set before the line feed operation.

9. A method of controlling an information processing apparatus, the method comprising:
causing, by using the information processing apparatus, a display section to display an edit screen that allows for an edit of a letter string over a plurality of lines, the letter string to be printed within a printable area on a print medium by a tape printing apparatus;
setting, by using the information processing apparatus, a letter size of the letter string over the plurality of lines, the letter string being entered through the edit screen; and
causing, by using the information processing apparatus, the tape printing apparatus to print the letter string over the plurality of lines entered through the edit screen in the set letter size, wherein
in setting of the letter size of the letter string over the plurality of lines, letter sizes of the letter string are configured to be differently set on the respective lines and, when a line feed operation is performed at a head or an end of an n-th line through the edit screen, a letter size of the n-th line being preset in accordance with a user's designation, n being an integer equal to or more than one, a letter size of at least one of the n-th line and an (n+1)-th line after the line feed operation is set so that a length, in a line direction, of the letter string over the plurality of lines entered through the edit screen is equal to or shorter than a length of the printable area in the line direction, the line direction being orthogonal to an extending direction of the lines.

10. The method of controlling an information processing apparatus according to claim 9, wherein
in setting of the letter size of the letter string over the plurality of lines, when a line feed operation is performed in a middle of the n-th line through the edit screen, a letter size of the n-th line and the (n+1)-th line after the line feed operation is set to a letter size of the n-th line which was set before the line feed operation.

11. A non-transitory computer-readable storage medium storing a program, the program comprising:
causing, by using an information processing apparatus, a display section to display an edit screen that allows for an edit of a letter string over a plurality of lines, the letter string to be printed within a printable area on a print medium by a tape printing apparatus;
setting, by using the information processing apparatus, a letter size of the letter string over the plurality of lines, the letter string being entered through the edit screen; and
causing, by using the information processing apparatus, the tape printing apparatus to print the letter string over the plurality of lines entered through the edit screen in the set letter size, wherein
in setting of the letter size of the letter string over the plurality of lines, the information processing apparatus is configured to differently set letter sizes of the letter string on the respective lines, and
when a line feed operation is performed at a head or an end of an n-th line through the edit screen, a letter size of the n-th line being preset in accordance with a user's designation, n being an integer equal to or more than one, the information processing apparatus sets a letter size of at least one of the n-th line and an (n+1)-th line after the line feed operation so that a length, in a line direction, of the letter string over the plurality of lines entered through the edit screen is equal to or shorter than a length of the printable area in the line direction, the line direction being orthogonal to an extending direction of the lines.

12. The non-transitory computer-readable storage medium according to claim 11, wherein
in setting of the letter size of the letter string over the plurality of lines, when a line feed operation is performed in a middle of the n-th line through the edit screen, a letter size of the n-th line and the (n+1)-th line after the line feed operation is set to a letter size of the n-th line which was set before the line feed operation.

* * * * *